(12) United States Patent
Filatau et al.

(10) Patent No.: US 12,546,519 B2
(45) Date of Patent: Feb. 10, 2026

(54) COOLING DEVICE

(71) Applicant: Huawei Digital Power Technologies Co., Ltd., Shenzhen (CN)

(72) Inventors: Sviataslau Alehavich Filatau, Minsk (BY); Jun Chen, Dongguan (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 141 days.

(21) Appl. No.: 18/511,633

(22) Filed: Nov. 16, 2023

(65) Prior Publication Data

US 2024/0085073 A1 Mar. 14, 2024

Related U.S. Application Data

(63) Continuation of application No. PCT/BY2021/000009, filed on May 19, 2021.

(51) Int. Cl.
| F25B 43/02 | (2006.01) |
| F25B 9/00 | (2006.01) |
| F25B 41/20 | (2021.01) |

(52) U.S. Cl.
CPC ............ F25B 43/02 (2013.01); F25B 9/00 (2013.01); F25B 41/20 (2021.01);
(Continued)

(58) Field of Classification Search
CPC .. F25B 43/02; F25B 41/20; F25B 9/00; F25B 2400/0401
See application file for complete search history.

(56) References Cited

U.S. PATENT DOCUMENTS

| 6,023,935 A | 2/2000 | Okazaki et al. |
| 6,837,063 B1 | 1/2005 | Hood, III et al. |

(Continued)

FOREIGN PATENT DOCUMENTS

| CN | 2854412 Y | 1/2007 | |
| CN | 105940280 A | * 9/2016 | ......... F28D 15/0266 |

(Continued)

OTHER PUBLICATIONS

Liu, A kind of heat pump type air conditioning system based on compressor air-discharging bypass defrosting, 2017, Full Document (Year: 2017).*

(Continued)

*Primary Examiner* — Nael N Babaa
(74) *Attorney, Agent, or Firm* — Leydig, Voit & Mayer, Ltd.

(57) ABSTRACT

A cooling device is provided, which comprises a cooling circuit comprising an evaporator and a compressor connected to the evaporator by a first fluid line of the cooling circuit, wherein the compressor is adapted to compress cooling agent in the cooling circuit during an active cooling mode, wherein the compressed cooling agent contains lubricant oil from the compressor. The cooling circuit comprises a condenser, which is connected to the compressor by a second fluid line of the cooling circuit. The second fluid line is connected to a fluid by-pass line of the cooling circuit by a separating portion, and wherein the separating portion is adapted to physically separate lubricant oil from the compressed cooling agent, so that the lubricant oil is collected in the fluid by-pass line.

25 Claims, 23 Drawing Sheets

(52) U.S. Cl.
CPC ... *F25B 2400/0401* (2013.01); *F25B 2500/16* (2013.01); *F25B 2600/2501* (2013.01)

(56) References Cited

U.S. PATENT DOCUMENTS

| | | | |
|---|---|---|---|
| 9,968,013 B2 | 5/2018 | Cacho Alonso | |
| 10,292,303 B2 | 5/2019 | Cacho Alonso et al. | |
| 2016/0265588 A1* | 9/2016 | Devitt | F16K 41/026 |
| 2018/0202696 A1* | 7/2018 | Satake | F25B 41/335 |
| 2020/0329585 A1 | 10/2020 | Fuller et al. | |
| 2021/0239118 A1* | 8/2021 | Lee | F04C 18/34 |

FOREIGN PATENT DOCUMENTS

| | | | | |
|---|---|---|---|---|
| CN | 107036349 A | * | 8/2017 | ............ F25B 47/022 |
| CN | 104976838 B | | 4/2019 | |
| CN | 110030752 B | | 5/2022 | |
| DE | 102015105500 B3 | | 9/2016 | |
| EP | 2413067 A1 | * | 2/2012 | ............ B04C 5/103 |
| EP | 3722720 A1 | | 10/2020 | |
| EP | 3723461 A1 | | 10/2020 | |
| JP | H03122473 A | | 5/1991 | |
| JP | 2006132897 A | * | 5/2006 | ............ F16L 9/006 |
| JP | 2007183041 A | | 7/2007 | |
| KR | 20080079957 A | | 9/2008 | |
| KR | 101955997 B1 | | 3/2019 | |
| WO | 2003095906 A1 | | 11/2003 | |
| WO | 2015193952 A1 | | 12/2015 | |
| WO | 2016103593 A1 | | 6/2016 | |
| WO | 2020176746 A1 | | 9/2020 | |

OTHER PUBLICATIONS

Suzuki, Enlarged-reduced diameter pipe and ejector using the same, 2004, Full Document (Year: 2004).*
Sakano, Oil Separator, 2009, Full Document (Year: 2009).*
Edwards, Mechanism for mitigating high heat-flux conditions in a thermosiphon evaporator or condenser, 2015, Full Document (Year: 2015).*

* cited by examiner

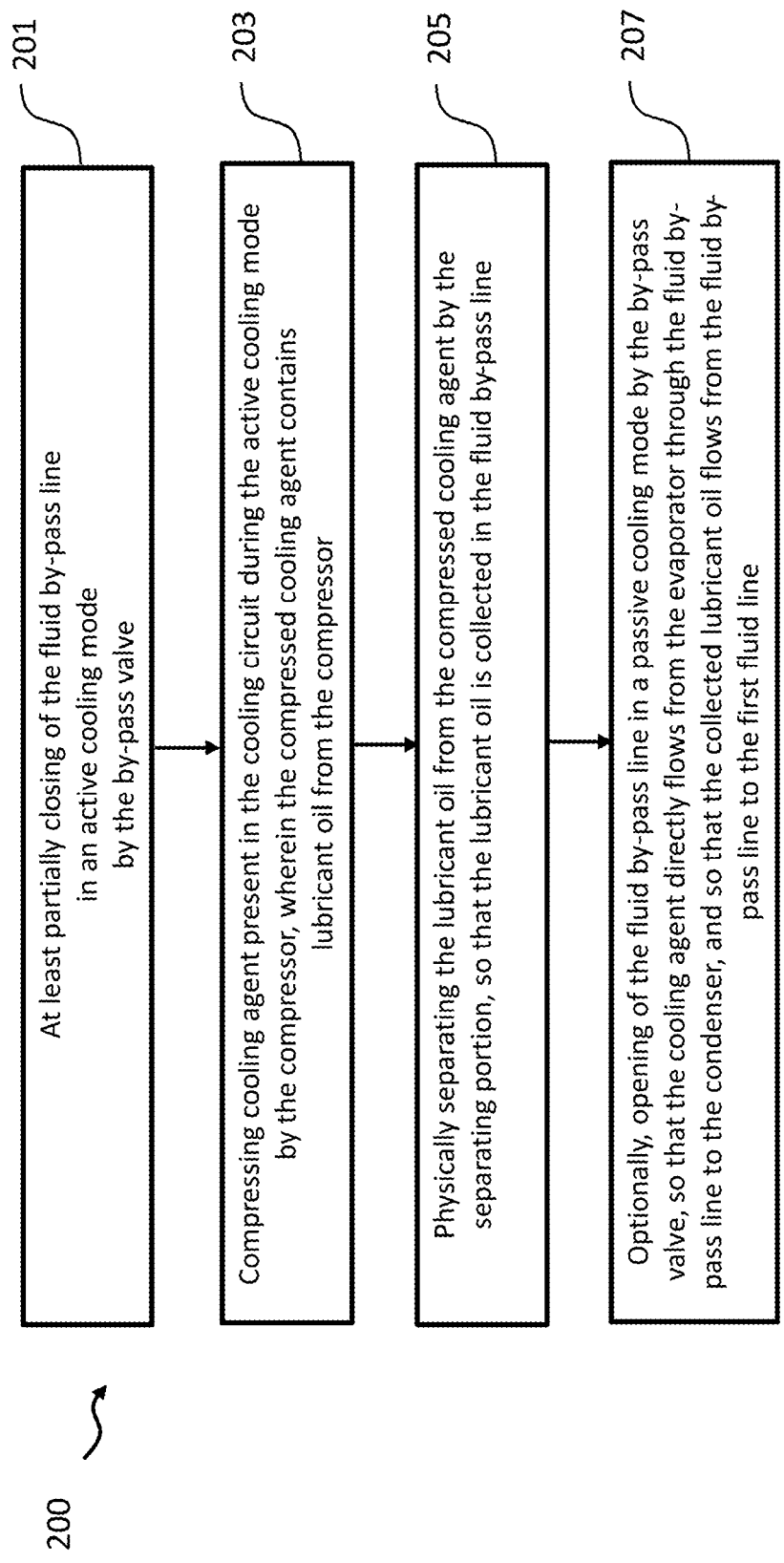

COOLING DEVICE

CROSS-REFERENCE TO RELATED APPLICATIONS

This application is a continuation of International Application No. PCT/BY2021/000009, filed on May 19, 2021, the disclosure of which is hereby incorporated by reference in its entirety.

TECHNICAL FIELD

Embodiments of the present disclosure relate to a cooling device. More specifically, embodiments of the present disclosure relate to a cooling device comprising a cooling circuit as well as to a method for cooling by using a cooling circuit of a cooling device, and in particular to the cooling device configured to operate in an active and a passive cooling mode.

BACKGROUND

A cooling device comprising a cooling circuit is commonly used, for example in heating, ventilation, and air conditioning devices (HVAC), to reduce the temperature in a room and/or a cabinet. During an active cooling mode of such cooling device, the flow of cooling agent within the cooling circuit is driven by a compressor of the cooling circuit, which compresses the cooling agent. Such a compressor can be an oil-lubricated compressor, wherein lubricant oil is used to lubricate moving parts of the compressor.

During a passive cooling mode, the compressor can be switched off for energy saving, and the flow of cooling agent within the cooling circuit is driven by the force of gravity according to the principle of a loop thermosiphon.

However, during an active cooling mode in commonly used cooling devices lubricant oil is transferred together with the compressed cooling agent to elements of the cooling circuit, which are located downstream of the compressor, for example to a condenser, an expansion device, and/or an evaporator of the cooling circuit. The transferred lubricant oil might be deposited within said elements, for example within the condenser and/or evaporator and might therefore reduce the efficiency of heat exchange performed by condenser and/or evaporator, and for example within the expansion device and might therefore block the flow of cooling agent through the expansion device.

Lubricant oil is hereby dissolved in the liquid phase of the cooling agent, which leads to an increase of viscosity. The flow of liquid cooling agent with increased viscosity leads to significantly increasing the flow resistance of said liquid cooling agent. This phenomenon mostly affects the operation of the cooling device during a passive cooling mode. If the content of lubricant oil at the condenser, evaporator and the corresponding connecting tubes is high, the force of gravity could be not enough to support the circulation of cooling agent during the passive cooling mode, and thereby the thermal performance of such passive cooling mode is very limited.

In conventional cooling devices oil separating elements can be used, in order to separate lubricant oil from the cooling agent circulating in the cooling circuit. For example, in U.S. Pat. No. 6,023,935 A such an oil separating element is disclosed.

However, conventionally used oil separating elements require additional installation space within the cooling device and increase the overall complexity of such conventional cooling device.

Therefore, it would be desirable to have a cooling device that alleviates the problems of the prior art.

SUMMARY

It is an objective of the present disclosure to provide a cooling device with the ability to operate during an active cooling mode and a passive cooling mode, said cooling device comprising a cooling circuit as well as a method for cooling by using a cooling circuit of a cooling device, wherein the cooling device and the method for cooling are configured such that the deposits of lubricant oil within elements of the cooling circuit downstream of the compressor can be prevented or at least reduced without increasing the overall size or complexity of the cooling device.

According to a first aspect a cooling device comprising a cooling circuit is provided, the cooling circuit comprising an evaporator; a compressor, which is connected to the evaporator by a first fluid line of the cooling circuit, wherein the compressor is adapted to compress cooling agent present in the cooling circuit during an active cooling mode, wherein the compressed cooling agent contains lubricant oil from the compressor; a condenser, which is connected to the compressor by a second fluid line of the cooling circuit; and a fluid by-pass line, which connects the first fluid line with the second fluid line, wherein the fluid by-pass line comprises a by-pass valve, which is adapted to at least partially close the fluid by-pass line in the active cooling mode, wherein the second fluid line is connected to the fluid by-pass line by a separating portion, and wherein the separating portion is adapted to physically separate lubricant oil from the compressed cooling agent, so that the lubricant oil is collected in the fluid by-pass line.

Therefore, the technical advantage is achieved that the fluid by-pass line of the cooling circuit could be used as a collection reservoir for lubricant oil, which has been separated from the compressed cooling agent at the separating portion. Therefore, only the compressed cooling agent is transferred from the separating portion further to the condenser, while the lubricant oil is retained in the fluid by-pass line, thereby preventing the formation of any disadvantageous deposits of lubricant oil within the condenser.

In particular, the oil separation at the separating portion is achieved by changes of velocity and direction of flow of the mixture comprising lubricant oil and compressed cooling agent, which enters the separating portion.

Moreover, the fluid by-pass line, which connects the first and the second fluid line, functions as a by-pass in respect to the compressor in a passive cooling mode, wherein in the passive cooling mode the compressor is deactivated and the circulation of cooling agent within the cooling circuit is driven by a reduced ambient temperature and gravitational forces according to the principle of a loop thermosiphon.

Therefore, no additional oil separating element is required in the cooling circuit, but instead the fluid by-pass line can provide a dual use function, by allowing cooling agent to flow through it in the passive cooling mode and by collecting lubricant oil in the active cooling mode.

In particular, the cooling device is not limited to any specific cooling application, but is adapted to cool any media, for example ambient air, liquid from an additional cooling circuit of another cooling device, a solid element, which generates heat, or any other solid or liquid material. Therefore, a cooling device according to the present disclosure may comprise heating, ventilation, and air conditioning devices (HVAC). In particular, the cooling device according to a possible implementation form is adapted to cool a cabinet, for example a server cabinet, for example by directly cooling servers within said server cabinet or for example by cooling air within said server cabinet thereby indirectly cooling the servers.

In particular, the cooling agent in the cooling circuit may comprise any conventionally used cooling agent, for example water, isobutane, tetrafluorethane and the like. In particular, the cooling agent can be present in the cooling circuit in two phases, for example in a liquid and in a gaseous phase. At lower temperatures and/or higher pressure the cooling agent is typically present in the liquid phase, while at higher temperatures and/or lower pressure, the cooling agent is typically present in the gaseous state. The cooling agent may be present in the cooling circuit as a mixture of liquid and gaseous phase.

In particular, the evaporator is adapted to evaporate the cooling agent present in a liquid state within the cooling circuit by supplying heat to the cooling agent, in order to obtain a gaseous cooling agent. In particular said heat supply to the evaporator is provided by a flow of ambient air, which temperature is higher than the temperature of the cooling agent entering the evaporator, to allow for a heat transfer from the ambient air to the cooling agent flowing through the evaporator. In particular, the evaporator comprises at least one evaporating tube for conducting the cooling agent through the evaporator. In particular, the evaporator may comprise any evaporating device, which is adapted to allow for an evaporation of the cooling agent.

In particular, the evaporator can be combined with auxiliary components, in particular valves, receivers, liquid separators, additional heat exchangers, filters, control units, sensors, and the like.

In particular, the compressor is positioned in the cooling circuit downstream of the evaporator. In particular, the compressor is adapted to compress gaseous cooling agent present in the cooling circuit during the active cooling mode.

In particular, the active cooling mode is characterized in that the compressor is activated and is adapted to compress gaseous cooling agent, which results in an increase of temperature of the cooling agent and in a pressure gradient within the cooling circuit, which pressure gradient drives the circulation of cooling agent within the cooling circuit, and which pressure gradient is generated by active work performed by the compressor.

In particular, the compressor can be combined with auxiliary components, in particular valves, receivers, liquid separators, additional heat exchangers, filters, control units, sensors, and the like.

In particular, the condenser is positioned in the cooling circuit downstream of the compressor. In particular, the condenser is adapted to condensate the compressed cooling agent, in particular compressed gaseous cooling agent, by dissipating heat from the cooling agent, in order to obtain liquid cooling agent. In particular, the condenser comprises at least one condensing tube for conducting the cooling agent through the condenser. In particular, the condenser may comprise any condensing device, which is adapted to allow for a condensation of the cooling agent.

In particular, the condenser can be combined with auxiliary components, in particular valves, receivers, liquid separators, additional heat exchangers, filters, control units, sensors, and the like.

In particular, said heat dissipation from the condenser is provided by a flow of ambient air, which temperature is lower than the temperature of the cooling agent entering the condenser, to allow for a heat transfer from the cooling agent flowing through the condenser to the ambient air.

In particular, the condenser is connected to the evaporator in order to close the cooling circuit, in particular by a third and fourth fluid line. In particular, the third and/or fourth fluid line comprises an expansion device, which is adapted to expand the liquid cooling agent exiting the condenser, in order to obtain expanded liquid cooling agent.

In particular, an at least partial closure of the fluid by-pass line by the by-pass valve comprises a complete closure of the fluid by-pass line by the by-pass valve, thereby preventing any flow of cooling agent and/or lubricant oil through the by-pass valve during the active cooling mode.

In particular as an alternative, an at least partial closure of the fluid by-pass line by the by-pass valve comprises a partial closure, e.g. partial opening, of the fluid by-pass line by the by-pass valve, which allows for a partial flow of lubricant oil from the fluid by-pass line through the partial opened by-pass valve into the first fluid line during the active cooling mode.

In particular, said partial closure, e.g. partial opening, of the fluid by-pass line can be achieved by a periodical opening of the by-pass valve to allow for a flow of lubricant oil from the fluid by-pass line into the first fluid line at specific points in time. Alternatively, in particular, said partial closure, e.g. partial opening, of the fluid by-pass line can be achieved by a constant partial opening of the fluid by-pass line to allow for a constant flow of lubricant oil from the fluid by-pass line into the first fluid line with a limited flow rate.

Due to the partial closure, e.g. partial opening of the by-pass valve, lubricant oil can flow from the fluid by-pass line and through the first fluid line to the suction port of the compressor, thereby allowing for a constant return of lubricant oil to the compressor.

In particular, the separating portion is adapted to physically separate lubricant oil from the compressed cooling agent in the active cooling mode, so that the separated lubricant oil is collected in the fluid by-pass line.

In a further possible implementation form of the first aspect, the by-pass valve is adapted to at least partially close the fluid by-pass line in the active cooling mode, the cooling device being configured so that during the active cooling mode the cooling agent is adapted to be pumped by the compressor from the evaporator through the first fluid line, through the compressor, and through the second fluid line to the condenser.

In particular in the active cooling mode the collected lubricant oil is retained in the fluid by-pass line, if the by-pass valve is adapted to completely close the fluid by-pass line in the active cooling mode.

In particular in the active cooling mode the collected lubricant oil is adapted to at least partially flow from the fluid by-pass line to the first fluid line, if the by-pass valve is adapted to partially close, e.g. partially opens, the fluid by-pass line in the active cooling mode.

In a further possible implementation form of the first aspect, the by-pass valve is adapted to open the fluid by-pass line in a passive cooling mode, the cooling device being configured so that during the passive cooling mode the cooling agent is adapted to flow from the evaporator through the first fluid line, through the fluid by-pass line and through the second fluid line to the condenser, and wherein in the passive cooling mode the collected lubricant oil is adapted to flow from the fluid by-pass line through the first fluid line to the compressor.

In particular, in the passive cooling mode the direction of flow of the lubricant oil through the fluid by-pass line is opposite to the direction of flow of the cooling agent through the fluid by-pass line.

In a further possible implementation form of the first aspect, in the active cooling mode the by-pass valve is adapted to completely close the fluid by-pass line, or in the active cooling mode the by-pass valve is adapted to partially close the fluid by-pass line by decreasing the cross-section of the fluid by-pass line between 1% and 99%.

In particular, in the active cooling mode the by-pass valve is adapted to partially close the fluid by-pass line by decreasing the cross-section of the fluid by-pass line between 50% and 99%, more particular in a range between 75% and 99%, even more particular in a range between 85% and 99%, and most particular in a range between 95% and 99%.

In particular, in the active cooling mode the by-pass valve is adapted to partially close the fluid by-pass line by decreasing the cross-section of the fluid by-pass line by 10%, 20%, 30%, 40%, 50%, 60%, 70%, 80%, 90%, 95%, 98% or 99%.

In a further possible implementation form of the first aspect, the separating portion is formed as a three-way junction comprising a first fluid connection to the compressor, a second fluid connection to the condenser, and a third fluid connection to the evaporator.

In particular, the first fluid connection to the compressor comprises at least a section of the second fluid line.

In particular the second fluid connection to the condenser comprises at least a section of the second fluid line and/or a section of the fluid by-pass line.

In particular, the fluid by-pass line is directly connected to the second fluid line, in which case the first fluid connection of the separating portion to the compressor comprises a section of the second fluid line, and the second fluid connection of the separating portion to the condenser comprises another section of the second fluid line.

In particular, the fluid by-pass line is directly connected to the condenser, in which case the first fluid connection of the separating portion to the compressor comprises the second fluid line, and the second fluid connection of the separating portion to the condenser comprises a section of the fluid by-pass line.

In particular the third fluid connection to the evaporator comprises at least a section of the fluid by-pass line and/or at least a section of the first fluid line.

In particular, the fluid by-pass line is directly connected to the first fluid line, in which case the third fluid connection of the separating portion to the evaporator comprises a section of the fluid by-pass line and a section of the first fluid line.

In particular, the fluid by-pass line is directly connected to the evaporator, in which case the third fluid connection of the separating portion to the evaporator comprises a section of the fluid by-pass line.

In a further possible implementation form of the first aspect, at the separating portion, an end portion of the second fluid line is inserted into the interior of the fluid by-pass line.

In particular the end portion of the second fluid line penetrates a wall of the fluid by-pass line.

In particular the fluid by-pass line is arranged vertically in the cooling device, wherein said vertical arrangement in particular is characterized by a vertical axis of the fluid by-pass line, which extends between a bottom housing part of the cooling device and a top housing pat of the cooling device.

In particular the end portion of the second fluid line is bent.

In particular, a wall of the fluid by-pass line can comprise helical inserts, which are adapted to guide the flow of lubricant oil through the fluid by-pass line.

In particular, a filtering element is installed between the end portion of the second fluid line and the interior of the fluid by-pass line.

The mixture of lubricant oil and compressed cooling agent exits the end portion within the interior of the fluid by-pass line with a high velocity, which results in a vortex and change of direction at the separating portion, which in turn results in that the compressed gaseous cooling agent flows towards the condenser and the heavy lubricant oil particles move downwards within the fluid by-pass line due to inertia and gravitational forces. Since the flow velocity of the compressed gaseous cooling agent towards the condenser is low, said cooling agent cannot push the heavy oil particles towards the condenser, so that an efficient oil separation is achieved.

In a further possible implementation form of the first aspect, the fluid by-pass line is oriented vertically in the cooling device, wherein compressed gaseous cooling agent containing lubricant oil is adapted to enter the interior of the fluid by-pass line through the end portion of the second fluid line, wherein the lubricant oil is adapted to be separated from the compressed gaseous cooling agent by the effect of gravity, the cooling device being configured so that the lubricant oil is adapted to drop down in the vertically oriented fluid by-pass line, and the cooling device being configured so that the compressed gaseous cooling agent is adapted to rise up in the vertically oriented fluid by-pass line by the pressure applied to the cooling agent from the compressor.

In a further possible implementation form of the first aspect, a first axis corresponding to the direction of extension of the fluid by-pass line and a second axis corresponding to the direction of extension of the end portion of the second fluid line are arranged with an angle in respect to each other.

In particular, the angle is between 1° and 180°. More particular, the angle is 90°, or the angle is between 15° and 89°, or the angle is between 91° and 135°.

In a further possible implementation form of the first aspect, the end portion of the second fluid line is inserted into the interior of the fluid by-pass line tangentially in respect to the circumference of the fluid by-pass line.

In a further possible implementation form of the first aspect, a second axis corresponding to the direction of extension of the end portion of the second fluid line intersects a first axis corresponding to the direction of extension of the fluid by-pass line, or wherein a second axis corresponding to the direction of extension of the end portion of the second fluid line is arranged at an offset with respect to a first axis corresponding to the direction of extension of the fluid by-pass line.

In a further possible implementation form of the first aspect, the diameter of at least a part of the second fluid line is smaller than the diameter of at least a part of the fluid by-pass line.

In particular, the diameter of the end portion of the second fluid line is smaller than the diameter of the fluid by-pass line at the separating portion.

In a further possible implementation form of the first aspect, the fluid by-pass line comprises an oil conveying element, which is adapted to convey the collected lubricant oil through the fluid by-pass line.

In particular, the oil conveying element is arranged in the fluid by-pass line at least partially between the by-pass valve and the separating portion.

In particular, the oil conveying element comprises a plurality of grooves and/or a porous material formed in a wall of the fluid by-pass line.

The oil conveying element, in particular the grooves and/or porous material allows for an efficient transfer of oil through the fluid by-pass line due to capillary forces and/or gravitational forces.

In a further possible implementation form of the first aspect, the cooling device comprises a control, wherein the fluid by-pass line and/or the by-pass valve comprises an oil level sensor, which is adapted to detect a level of lubricant oil collected in the fluid by-pass line, and/or a flow rate sensor, which is adapted to detect a flow rate of lubricant oil flowing in the fluid by-pass line, and wherein the control is adapted to operate the by-pass valve in dependence of the detected level of lubricant oil and/or in dependence of the detected flow rate of lubricant oil.

In particular, the fluid by-pass line or the by-pass valve comprises the oil level sensor, wherein the control is adapted to operate the by-pass valve in dependence of the detected level of lubricant oil.

In particular, the fluid by-pass line or the by-pass valve comprises the flow rate sensor, wherein the control is adapted to operate the by-pass valve in dependence of the detected flow rate of lubricant oil.

In particular, the fluid by-pass line comprises the oil level sensor and the flow rate sensor, wherein the control is adapted to operate the by-pass valve in dependence of the detected level of lubricant oil and the detected flow rate of lubricant oil.

In particular, the by-pass valve comprises the oil level sensor and the flow rate sensor, wherein the control is adapted to operate the by-pass valve in dependence of the detected level of lubricant oil and the detected flow rate of lubricant oil.

In particular, the fluid by-pass line comprises the oil level sensor, and the by-pass valve comprises the flow rate sensor, wherein the control is adapted to operate the by-pass valve in dependence of the detected level of lubricant oil and the detected flow rate of lubricant oil.

In particular, the fluid by-pass line comprises the flow rate sensor, and the by-pass valve comprises the oil level sensor, wherein the control is adapted to operate the by-pass valve in dependence of the detected level of lubricant oil and the detected flow rate of lubricant oil.

In particular, the control is adapted to switch the by-pass valve between a first valve position for completely closing the fluid by-pass line to a second valve position for completely opening the fluid by-pass line, if the level of lubricant oil detected by oil level sensor increases above a level threshold.

In particular, the control is adapted to switch the by-pass valve in several intermediate valve positions between the first and second valve positions, if the detected level of lubricant oil increases above a level threshold, so that in said intermediate valve positions the fluid by-pass line is only partially opened.

In particular, the control is adapted to switch the by-pass valve between a second valve position for completely opening the fluid by-pass line to a first valve position for completely closing the fluid by-pass line, if the flow of lubricant oil detected by the flow rate sensor increases above a flow rate threshold.

In particular, the control is adapted to switch the by-pass valve in several intermediate valve positions between the first and second valve positions, if the flow of lubricant oil detected by flow rate sensor increases above a flow rate threshold, so that in said intermediate valve positions the fluid by-pass line is only partially closed.

In a further possible implementation form of the first aspect, the cooling circuit further comprising an expansion device, which is connected to the condenser by a third fluid line of the cooling circuit, and which is connected to the evaporator by a fourth fluid line of the cooling circuit; and a further fluid by-pass line, which connects the third fluid line with the fourth fluid line, wherein the further fluid by-pass line comprises a further by-pass valve, which is adapted to close the further fluid by-pass line in the active cooling mode and to open the further fluid by-pass line in a passive cooling mode, wherein in the passive cooling mode the cooling agent is adapted to directly flow from the condenser through the further fluid by-pass line to the evaporator.

In particular, the expansion device is positioned in the cooling circuit downstream of the condenser and upstream of the evaporator.

In particular, the expansion device is adapted to expand the liquid cooling agent.

In particular, the expansion device can be a thermal expansion valve, an electronic expansion valve, a capillary tube, an ejector, a turbine, a ball valve, an orifice and/or a porous plug.

In a further possible implementation form of the first aspect, the further by-pass valve is adapted to close the further fluid by-pass line in a first valve position, the cooling device being configured so that during the active cooling mode the cooling agent is adapted to be pumped by the compressor from the condenser through the third fluid line, through the expansion device, and through the fourth fluid line to the evaporator, and the further by-pass valve is adapted to open the further fluid by-pass line in a second valve position, the cooling device being configured so that during the passive cooling mode the cooling agent is adapted to flow from the condenser through the third fluid line, through the further fluid by-pass line, and through the fourth fluid line to the evaporator.

In a further possible implementation form of the first aspect, in the active cooling mode the by-pass valve is adapted to at least partially close the fluid by-pass line and the further by-pass valve is in the first valve position to close the further fluid by-pass line, wherein in the active cooling mode the compressor is adapted to compress gaseous cooling agent, wherein the compressed gaseous cooling agent is adapted to be conducted through the second fluid line to the condenser, wherein the condenser is adapted to condensate the compressed gaseous cooling agent, in order to obtain liquid cooling agent, wherein the liquid cooling agent is adapted to be conducted through the third fluid line to the expansion device, wherein the expansion device is adapted to expand the liquid cooling agent, in order to obtain expanded liquid cooling agent, wherein the expanded liquid cooling agent is adapted to be conducted through the fourth fluid line to the evaporator, wherein the evaporator is adapted to evaporate the expanded liquid cooling agent, in order to obtain the gaseous cooling agent, wherein the gaseous cooling agent is adapted to be conducted through the first fluid line to the compressor, and wherein in the active cooling mode the separating portion is adapted to physically separate lubricant oil from the compressed gaseous cooling agent, so that the lubricant oil is collected in the fluid by-pass line.

In a further possible implementation form of the first aspect, in the passive cooling mode the by-pass valve is adapted to open the fluid by-pass line, and the further by-pass valve is in the second valve position to open the further fluid by-pass line, wherein in the passive cooling mode the compressor is deactivated, wherein in the passive cooling mode gaseous cooling agent is adapted to be conducted from the evaporator through the first fluid line, through the fluid by-pass line and through the second fluid line to the condenser, wherein the condenser is adapted to condensate the gaseous cooling agent, in order to obtain liquid cooling agent, wherein the liquid cooling agent is adapted to be conducted through the third fluid line, through the further fluid by-pass line and through the fourth fluid line to the evaporator, wherein the evaporator is adapted to evaporate the liquid cooling agent, in order to obtain the gaseous cooling agent, and wherein in the passive cooling mode the lubricant oil, which is collected in the fluid by-pass line, is adapted to flow from the fluid by-pass line through the first fluid line to the compressor.

In a further possible implementation form of the first aspect, the by-pass valve is formed as a ball valve comprising a ball element, which is received in a ball housing, wherein the ball element is rotatable between a first rotation position and a second rotation position, wherein the ball element comprises at least one channel for conducting cooling agent through the ball element in the first rotation position of the ball element, and wherein the at least one channel for conducting cooling agent is sealed off by the ball housing in the second rotation position of the ball element.

In particular, the ball is rotatable into intermediate rotational positions between the first and second rotation position, wherein in said intermediate rotational positions the at least one channel for conducting cooling agent is partially sealed off by the ball housing, so that a partial flow of cooling agent and lubricant oil through the at least one channel is enabled.

In particular, the first and second rotation position are oriented perpendicular with respect to each other.

In particular the ball element comprises a rotation shaft, which penetrates the ball housing, wherein the rotation shaft is drivable by a motor of the ball valve in order to rotate the ball element between the first rotation position and the second rotation position.

In a further possible implementation form of the first aspect, at least a part of the ball element and/or at least a part of the ball housing is formed from a porous material, which is adapted to conduct lubricant oil through the ball element and/or through the ball housing.

In a further possible implementation form of the first aspect, the ball element comprises a first channel for conducting cooling agent through the ball element in the first rotation position of the ball element, and wherein the ball element comprises a second channel or second groove for conducting lubricant oil through the ball element in the second rotation position of the ball element.

In particular the first channel and second channel extend perpendicular with respect to each other through the ball element.

In particular the first and second channel intersect each other in the ball element.

In particular the second groove is formed on a surface of the ball element.

In particular, the diameter of the first channel is greater than the diameter of the second channel or second groove. The smaller diameter of the second channel or second groove limits any by-pass flow of cooling agent through the ball element in the second rotation position.

In a further possible implementation form of the first aspect, the second channel or second groove of the ball element is sealed off by the ball housing in the first rotation position of the ball element, and the first channel of the ball element is sealed off by the ball housing in the second rotation position of the ball element.

In a further possible implementation form of the first aspect, the ball housing comprises a third channel or a third groove for conducting lubricant oil through the ball housing.

In particular the diameter of the first channel is greater than the diameter of the third channel or third groove.

In a further possible implementation form of the first aspect, the fluid by-pass line comprises an oil collecting portion for collecting lubricant oil in the fluid by-pass line, wherein the oil collecting portion is connected to an oil release line, wherein the oil release line is connected to the first fluid line, in order to conduct lubricant oil from the oil collecting portion through the oil release line to the first fluid line.

In particular the oil collecting portion is arranged vertically below the separating portion.

In particular the fluid by-pass line comprises a cooling agent inserting portion through which the cooling agent from the first fluid line can enter the fluid by-pass line, wherein in particular the cooling agent inserting portion is connected to the fluid by-pass line between the separating portion and the oil collecting portion.

In particular the oil release line comprises a capillary tube.

In a further possible implementation form of the first aspect, the oil collecting portion comprises a recess, which is formed in a wall of the fluid by-pass line or the oil collecting portion comprises a tapering section of the fluid by-pass line.

In particular, the tapering section is formed at a bottom end of the fluid by-pass line. Thereby, the lubricant oil can flow downwards along the wall of the fluid by-pass line due to gravitational forces into the tapering section.

In a further possible implementation form of the first aspect, the oil release line comprises an oil release valve, which is adapted to close the oil release line in order to retain the lubricant oil in the oil collecting portion or to open the oil release line in order to transfer the lubricant oil from the oil collecting portion through the oil release line to the first fluid line.

In a further possible implementation form of the first aspect, the cooling device comprises a control, wherein the oil release line and/or oil release valve comprises a further oil level sensor, which is adapted to detect a level of lubricant oil collected in the oil release line and/or a further flow rate sensor, which is adapted to detect a flow rate of lubricant oil flowing from the oil collecting portion to the oil release valve, and wherein the control is adapted to operate the oil release valve in dependence of the detected level of lubricant oil and/or in dependence of the detected flow rate of lubricant oil.

In particular, the control is adapted to switch the oil release valve between the first valve position for completely closing the oil release line to the second valve position for completely opening the oil release line, if the detected level of lubricant oil increases above a further level threshold. However, at intermediate positions of the oil release valve are possible for partially closing the oil release line, so that a partial flow of lubricant oil through the oil release valve is allowed.

In particular, the control is adapted to switch the oil release valve between the second valve position for completely opening the oil release line to a first valve position for completely closing the oil release line, if the detected flow of lubricant oil increases above a flow rate threshold. Reference is provided to the control of the by-pass valve further above for further details.

According to a second aspect a method for cooling by using a cooling circuit of a cooling device is provided, wherein the cooling circuit comprises an evaporator, a compressor, which is connected to the evaporator by a first fluid line of the cooling circuit, a condenser, which is connected to the compressor by a second fluid line of the cooling circuit, and a fluid by-pass line of the cooling circuit, which connects the first fluid line with the second fluid line, wherein the second fluid line is connected to the fluid by-pass line by a separating portion, and wherein the fluid by-pass line comprises a by-pass valve. The method comprising the following steps:

- at least partially closing of the fluid by-pass line in an active cooling mode by the by-pass valve;
- compressing cooling agent present in the cooling circuit during the active cooling mode by the compressor, wherein the compressed cooling agent contains lubricant oil from the compressor; and
- physically separating the lubricant oil from the compressed cooling agent by the separating portion, so that the lubricant oil is collected in the fluid by-pass line.

In a further possible implementation form of the second aspect, the method comprises the following step:

- opening of the fluid by-pass line in a passive cooling mode by the by-pass valve, so that the cooling agent directly flows from the evaporator through the fluid by-pass line to the condenser, and so that the collected lubricant oil flows from the fluid by-pass line to the first fluid line.

Details of one or more embodiments are set forth in the accompanying drawings and the description below. Other features, objects, and advantages will be apparent from the description, drawings, and claims.

BRIEF DESCRIPTION OF THE DRAWINGS

In the following, embodiments of the present disclosure are described in more detail with reference to the attached figures and drawings, in which:

FIG. 23 is a flow diagram illustrating a method for cooling according to an embodiment of the present disclosure.

In the following, identical reference signs refer to identical or at least functionally equivalent features.

DETAILED DESCRIPTION OF THE EXAMPLES

In the following description, reference is made to the accompanying figures, which form part of the disclosure, and which show, by way of illustration, specific aspects of examples of the present disclosure or specific aspects in which examples of the present disclosure may be used. It is understood that examples of the present disclosure may be used in other aspects and comprise structural or logical changes not depicted in the figures. The following detailed description, therefore, is not to be taken in a limiting sense, and the scope of the present disclosure is defined by the appended claims.

For instance, it is to be understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various examples and/or aspects described herein may be combined with each other, unless specifically noted otherwise.

Figure 1:
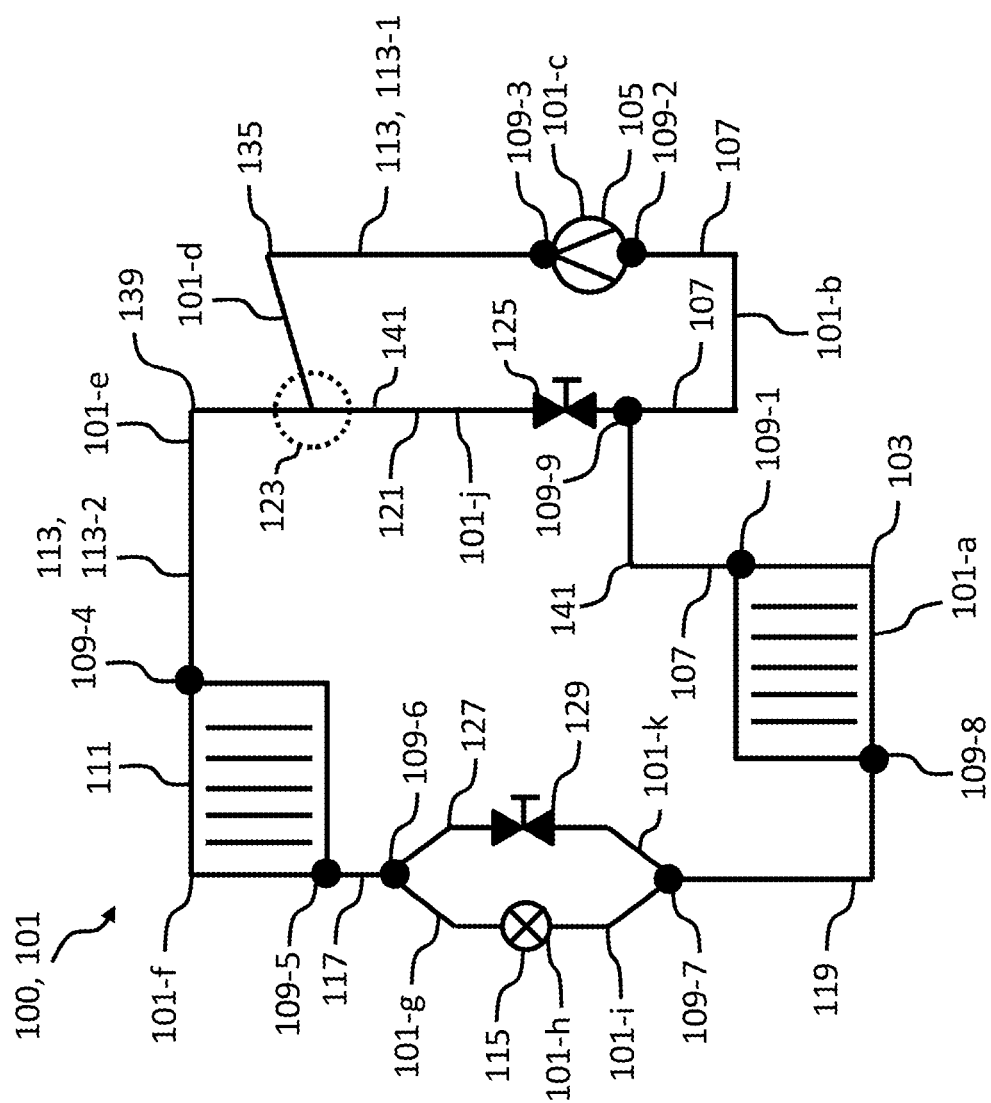
FIG. 1 is a schematic diagram of a cooling device comprising a cooling circuit according to an embodiment of the present disclosure.

FIG. 1 is a schematic diagram of a cooling device 100 comprising a cooling circuit 101 according to an example.

The cooling device 100, which is only schematically shown in FIG. 1, is not limited to any specific cooling application, but is adapted to cool any media, for example ambient air, liquid from an additional cooling circuit of another cooling device, a solid element, which generates heat, or any other solid or liquid material. Therefore, heating, ventilation, and air conditioning devices (HVAC) are comprised by a cooling device 100 according to the example.

Only as an example, the cooling device 100 according to the example is adapted to cool a cabinet, for example a server cabinet, which for example directly cools servers within said server cabinet or which for example cools the air within said server cabinet, thereby indirectly cooling the servers.

As illustrated in FIG. 1, the cooling circuit 101 of the cooling device 100 comprises inter alia a compressor 105, a condenser 111, an expansion device 115, and an evaporator 103, which are fluidically connected within the cooling circuit 101. A cooling agent, for example tetrafluorethane, is flowing through the cooling circuit 101. Said cooling agent is characterized in that it can be present in the cooling circuit 101 in two phases, e.g. in a liquid and in a gaseous phase. At lower temperatures and/or higher pressure the cooling agent is typically present in the liquid phase, while at higher temperatures and/or lower pressure, the cooling agent is typically present in the gaseous phase.

In the following the cooling circuit 101 of the cooling device 100 is described, wherein in particular reference to an active cooling mode is provided.

The evaporator 103 forms a first section 101-a of the cooling circuit 101. The evaporator 103 is adapted to evaporate the cooling agent present in the liquid state in the cooling circuit 101 by supplying heat to the cooling agent, in order to obtain a gaseous cooling agent.

Said heat supply to the evaporator 103 typically is provided by a flow of ambient air, which temperature is higher than the temperature of the cooling agent entering the evaporator 103, to allow for a heat transfer from the ambient air to the cooling agent flowing through the evaporator 103. To enable an efficient heat transfer, the evaporator 103 in particular comprises extended surface areas, which for example can comprise at least one evaporating tube, a top part of the evaporator 103, a bottom part of the evaporator 103, and/or evaporating fins.

At a first connection point 109-1, the evaporator 103 is connected to a first fluid line 107 of the cooling circuit 101, wherein said first fluid line 107 forms a second section 101-b of the cooling circuit 101. The first fluid line 107 is adapted to transfer the gaseous cooling agent from the evaporator 103 to the compressor 105, which forms a third section 101-c of the cooling circuit 101. The first fluid line 107 is connected to the compressor 105 at a second connection point 109-2.

At a ninth connection point 109-9, the first fluid line 107 is connected to a first by-pass line 121 of the cooling circuit 101, wherein said first by-pass line 121 will be explained in more detail further below.

The compressor 105, which is positioned in the cooling circuit 101 downstream of the evaporator 103, is adapted to compress the gaseous cooling agent during the active cooling mode, in order to obtain compressed gaseous cooling agent. During compression, the compressor 105, which is driven by electrical energy, pressurizes the gaseous cooling agent thereby allowing for an increase of temperature of the cooling agent and for an active flow of the compressed gaseous cooling agent further downstream through the cooling circuit 101.

In this respect, it is mentioned that the compressor 105 is formed as an oil-lubricated compressor 105, which is characterized in that its moving parts are lubricated by lubricant oil to reduce friction. However, during compression, at least a part of the lubricant oil, which is present in the compressor 105, can be transported together with the compressed gaseous cooling agent further downstream in the cooling circuit 101.

At a third connection point 109-3, the compressor 105 is connected to a second fluid line 113 of the cooling circuit 101. The second fluid line 113 is adapted to transfer the compressed gaseous cooling agent from the compressor 105 to the condenser 111. The second fluid line 113 is connected to the condenser 111 at a fourth connection point 109-4.

As can be derived from FIG. 1, the second fluid line 113 is connected to the fluid by-pass line 121 of the cooling circuit 101 by a separating portion 123, wherein said separating portion 123 is adapted to physically separate lubricant oil from the compressed gaseous cooling agent, so that the separated lubricant oil is collected in the fluid by-pass line 121. The separating portion 123 will be explained in more detail further below.

Therefore, a first section 113-1 of the second fluid line 113, which connects the compressor 105 with the separating portion 123, forms a fourth section 101-d of the cooling circuit 101, and a second section 113-2 of the second fluid line 113, which connects the separating portion 123 with the condenser 111, forms a fifth section 101-e of the cooling circuit 101.

Thereby, the separating portion 123 is formed as a three-way junction comprising a first fluid connection 135 to the compressor 105, a second fluid connection 139 to the condenser 111, and third fluid connection 141 to the evaporator 103.

In particular, the first fluid connection 135 to the compressor 105 comprises at least a part of the second fluid line 113, in particular the first section 113-1 of the second fluid line 113.

In particular the second fluid connection 139 to the condenser 111 comprises at least a part of the second fluid line 113, in particular the second section 113-2 of the second fluid line 113, and/or at least a part of the fluid by-pass line 121.

In particular the third fluid connection 141 to the evaporator 103 comprises at least a part of the fluid by-pass line 121 and/or at least a part of the first fluid line 107.

The condenser 111 forms a sixth section 101-f of the cooling circuit 101. The condenser 111, which is positioned in the cooling circuit 101 downstream of the compressor 105, is adapted to condensate the compressed cooling agent by dissipating heat from the cooling agent, in order to obtain liquid cooling agent.

Said heat dissipating from the condenser 111 typically is transferred to a flow of ambient air, which temperature is lower than the temperature of the cooling agent entering the condenser 111, to allow for a heat transfer from the cooling agent flowing through the condenser 111 to the ambient air. To enable an efficient heat dissipation, the condenser 111 in particular comprises extended surface areas, which for example can comprise at least one condensing tube, a top part of the condenser 111, a bottom part of the condenser 111, and/or condensing fins.

At a fifth connection point 109-5, the condenser 111 is connected to a third fluid line 117 of the cooling circuit 101, wherein said third fluid line 117 forms a seventh section 101-g of the cooling circuit 101. The third fluid line 117 is adapted to transfer the liquid cooling agent from the condenser 111 to the expansion device 115, which forms an eight section 101-h of the cooling circuit 101.

The expansion device 115 in particular is positioned in the cooling circuit 101 downstream of the condenser 111 and upstream of the evaporator 103. The expansion device 115 in particular is adapted to expand the liquid cooling agent, in order to obtained expanded liquid cooling agent, wherein said expanded liquid cooling agent in particular can comprise a two-phase mixture of gaseous and liquid cooling agent. The expansion device 115 in particular can be a thermal expansion valve, an electronic expansion valve, a capillary tube, an ejector, a turbine, a ball valve, an orifice and/or a porous plug.

A fourth fluid line 119 of the cooling circuit 101, which forms a ninth section 101-i of the cooling circuit 101, connects the expansion device 115 with the evaporator 103, in particular at an eight connection point 109-8, thereby closing the cooling circuit 101.

At a sixth connection point 109-6, the third fluid line 117 is connected to a further fluid by-pass line 127 of the cooling circuit 101, wherein said further fluid by-pass line 127 joins the fourth fluid line 119 at a seventh connection point 109-7. The further fluid by-pass line 127 will be explained in more detail further below.

The above described active cooling mode of the cooling is typically required when the temperature of ambient air, which in particular corresponds to air contacting the condenser, is above or close to the temperature of air inside the cabinet, which in particular corresponds to air flowing from the evaporator to the cabinet). Said active cooling mode requires the active work of the compressor 105 and thereby consumes electrical energy.

In case, the temperature of ambient air, which in particular corresponds to air contacting the condenser, is below the temperature of air inside the cabinet, which in particular corresponds to air flowing from the evaporator to the cabinet, a passive cooling mode can be applied. In the passive cooling mode, the compressor 105 is deactivated for energy saving, and the circulation of the cooling agent through the cooling circuit 101 is provided by the principle of a loop thermosiphon (LTS).

As can be derived from FIG. 1, the fluid by-pass line 121, which forms a tenth section 101-j of the cooling circuit 101, is connected to the first fluid line 107 at the ninth connection point 109-9, and is connected to the second fluid line 113 at the separating portion 123. The fluid by-pass line 121 comprises a by-pass valve 125, which is adapted to allow flow of cooling agent through the fluid by-pass line 121 during the passive cooling mode.

Thereby, the fluid by-pass line 121 forms a by-pass in respect to the compressor 105, so that the gaseous cooling agent can direct flow from the evaporator 103 to the condenser 111.

As can be derived from FIG. 1, the further fluid by-pass line 127, which forms a eleventh section 101-k of the cooling circuit 101, is connected to the third fluid line 117 at the sixth connection point 109-6, and is connected to the fourth fluid line 119 at the seventh connection point 109-7. The further fluid by-pass line 127 comprises a further by-pass valve 129, which is adapted to allow flow of cooling agent through the further fluid by-pass line 127 during the passive cooling mode.

Thereby, the further fluid by-pass line 127 forms a by-pass in respect to the expansion device 115, so that the liquid cooling agent can direct flow from the condenser 111 back to the evaporator 103.

Figure 2:
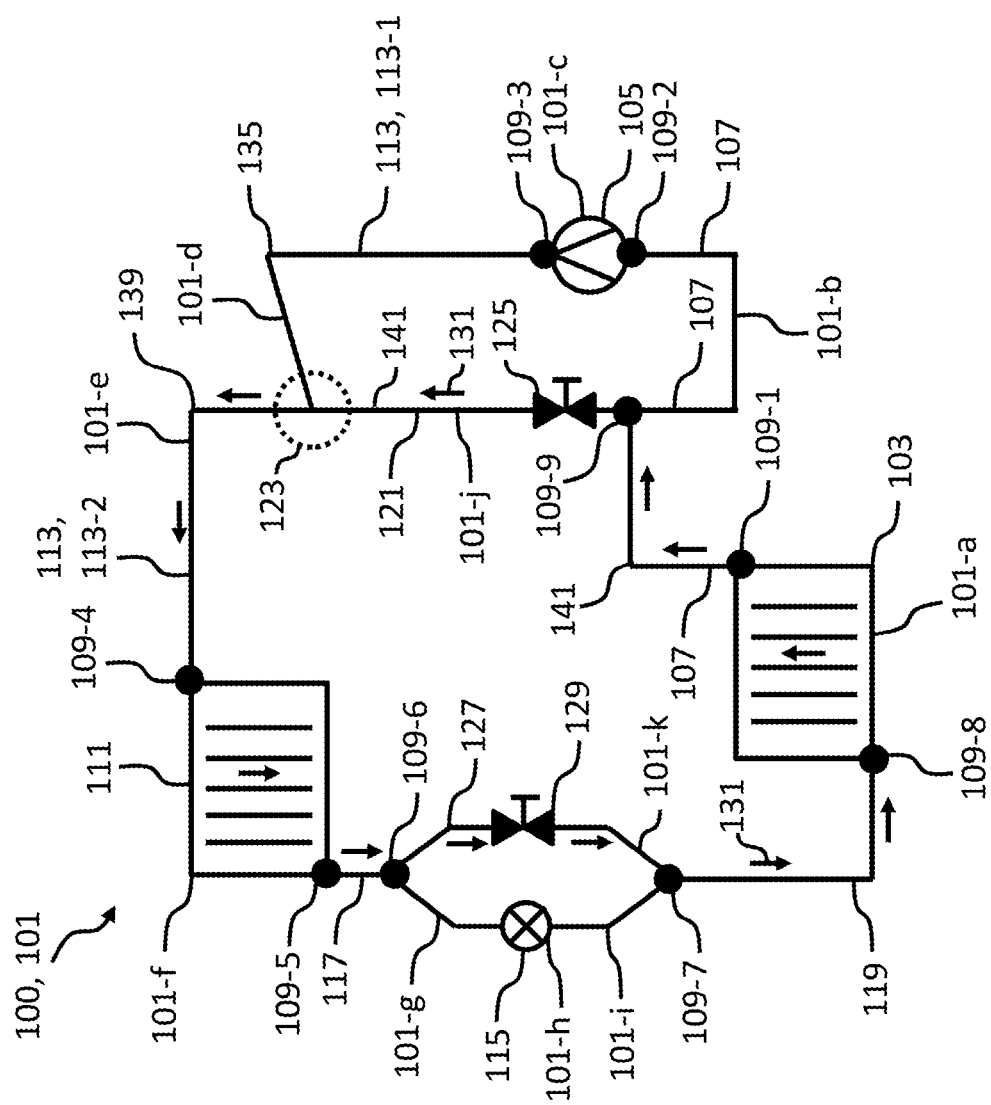
FIG. 2 is a schematic diagram of a cooling device comprising a cooling circuit during a passive cooling mode according to an embodiment of the present disclosure.
Figure 3:
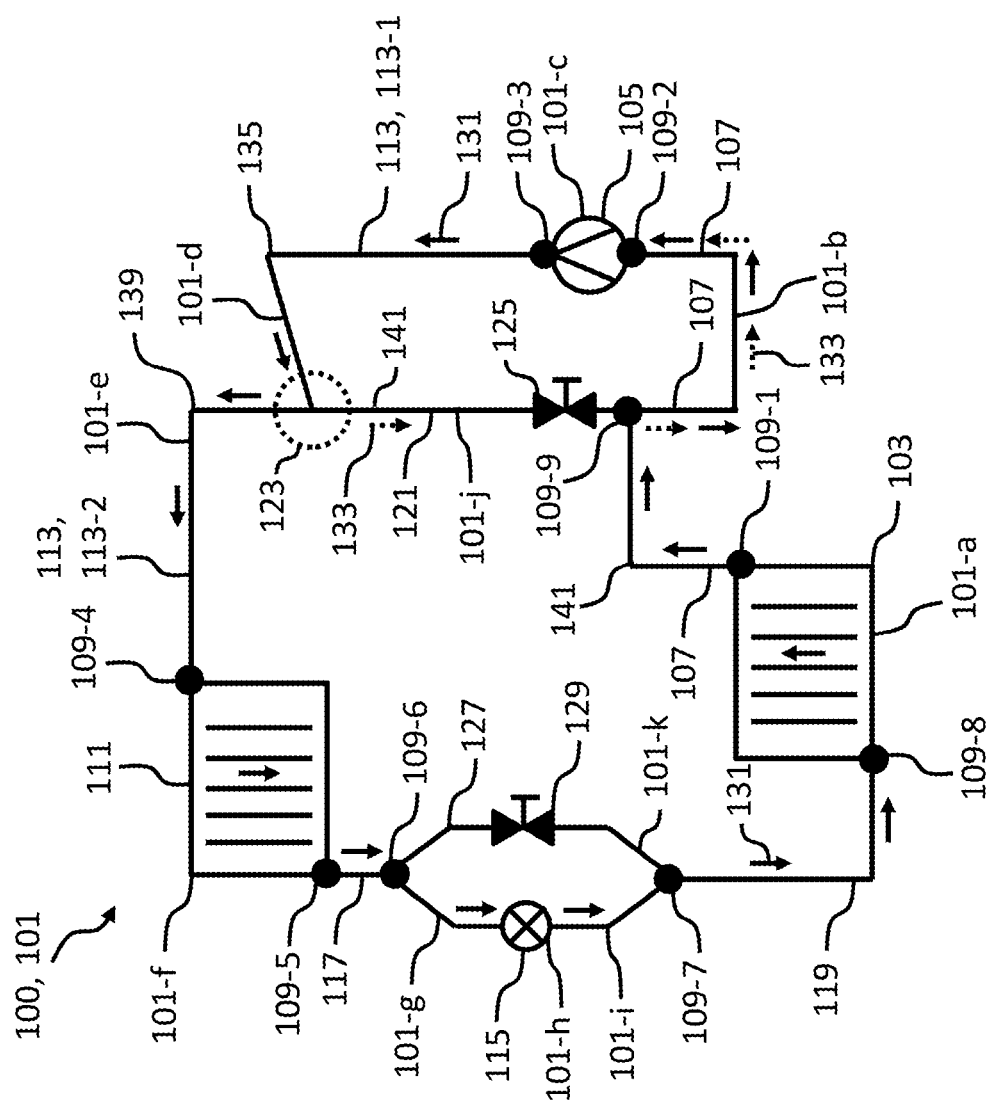
FIG. 3 is a schematic diagram of a cooling device comprising a cooling circuit during an active cooling mode according to an embodiment of the present disclosure.

For further details in respect to the passive cooling mode reference to FIG. 2 is provided and in respect to the active cooling mode reference to FIG. 3 is provided.

FIG. 2 is a schematic diagram of a cooling device 100 comprising a cooling circuit 101 during a passive cooling mode according to an example.

The cooling circuit 101 depicted in FIG. 2 corresponds to the cooling circuit 101 depicted in FIG. 1.

During the passive cooling mode the compressor 105 of the cooling circuit 101 is deactivated and the by-pass valve 125 is adapted to open the fluid by-pass line 121, so that during the passive cooling mode the gaseous cooling agent, which has been evaporated in the evaporator 103, flows from the evaporator 103 through the first fluid line 107, through the fluid by-pass line 121, and through the second fluid line 113 to the condenser 111. In the condenser 111 the gaseous cooling agent is liquified, in order to obtain liquid cooling agent.

During the passive cooling the further by-pass valve 129 is adapted to open the further fluid by-pass line 127, so that during the passive cooling mode the liquid cooling agent flows from the condenser 111 through the further fluid by-pass line 127 back to the evaporator 103, at which the liquid cooling agent is evaporated again, thereby closing the passive cooling cycle.

The corresponding direction of flow of the cooling agent 131 is marked with arrows in FIG. 2.

The circulation between vapor and liquid phases of the cooling agent between the condenser 111 and the evaporator 103 during the passive cooling mode in particular is enabled by the natural flow of the cooling agent due to gravitational forces.

In particular, the diameter of at least a part of the fluid by-pass line 121 is larger than the diameter of at least a part the first fluid line 107, so that when the by-pass valve 125 is fully opened during the passive cooling mode, at the ninth connection point 109-9 the gaseous cooling agent predominantly flows from the first fluid line 107 in the fluid by-pass line 121.

In particular, the diameter of at least a part of the further fluid by-pass line 127 is larger than the diameter at least a part of the third fluid line 117, so that when the further by-pass valve 129 is fully opened during the passive cooling mode, at the sixth connection point 109-6 the liquid cooling agent predominantly flows from the third fluid line 117 in the further fluid by-pass line 127.

Further, during the passive cooling mode, oil migration of lubricant oil through the cooling circuit 101 is not significant, because the compressor 105 is deactivated and the main volume of lubricant oil is maintained at the compressor 105.

FIG. 3 is a schematic diagram of a cooling device 100 comprising a cooling circuit 101 during an active cooling mode according to an example.

During the active cooling mode the compressor 105 of the cooling circuit 101 is activated, the by-pass valve 125 is adapted to at least partially close the fluid by-pass line 121, and the further by-pass valve 129 is adapted to at least partially close the further fluid by-pass line 127.

Therefore, during the active cooling mode the cooling agent flows from the evaporator 103 through the first fluid line 107, through the compressor 105, through the second fluid line 113, through the condenser 111, through the third fluid line 117, through the expansion device 115, and through the fourth fluid line 119 back to the evaporator 103 as described in detail in respect to FIG. 1.

The circulation between vapor and liquid phases of the cooling agent within the cooling circuit 101 during the active cooling mode is enabled by active work from the compressor 105, in combination with the expansion of liquid cooling agent at the expansion device 115.

The corresponding direction of flow of the cooling agent 131 is marked with arrows in FIG. 3.

As mentioned above, due to employing an oil-lubricated compressor 105, oil particles can be transferred together with the compressed gaseous cooling agent from the compressor 105 to other components of the cooling circuit 101, which are located downstream of the compressor 105, for example to the condenser 111, the expansion device 115 and/or the evaporator 103.

Deposits of lubricant oil within for example the evaporator 103 and/or condenser 111 might impair the efficiency of heat transfer with the ambient air, and since deposits of lubricant oil within for example the expansion device 115 might restrict the flow of cooling agent through the expansion device. Moreover, the presence of dissolved lubricant oil in the liquid phase of the cooling agent, leads to an increase in the viscosity of the cooling agent and to a significant increase of the flow resistance. At such condition, the force of gravity is not enough for an efficient circulation during the active cooling mode, and the thermal performance of the cooling device 100 during the passive cooling mode is poor. Therefore, the example of the present disclosure allows for an efficient separation of lubricant oil from the cooling agent before the lubricant oil reaches the condenser 111, the expansion device 115 and/or evaporator 103.

Therefore, the second fluid line 113, in particular the first section 113-1 of the second fluid line 113, is connected to the fluid by-pass line 121 by a separating portion 123, which is adapted to physically separate the lubricant oil from the compressed gaseous cooling agent, so that the lubricant oil is collected in the fluid by-pass line 121 and the remaining compressed gaseous cooling agent can flow through the second section 113-2 of the second fluid line 113 further to the condenser 111.

Said physical oil separation is in particular achieved by changes in velocity and flow direction of the mixture of lubricant oil and compressed gaseous cooling at the separating portion 123. As it will be explained with more details further below, due to said changes in velocity and flow direction, the heavy oil particles, in particular due to inertia and/or gravitational effects, move down from the separating portion 123 into the fluid by-pass line 121, while the lighter compressed gaseous cooling agent is transported to the top end of the fluid by-pass line 121 and from there further to the condenser 111.

Due to the at least partial closure of the fluid by-pass line 121 by the by-pass valve 125 during the active cooling mode, the lubricant oil is collected in the fluid by-pass line 121 until the by-pass valve 125 opens the fluid by-pass line 121.

An at least partial closure of the fluid by-pass line 121 by the by-pass valve 125 during the active cooling mode comprises a complete closure of the fluid by-pass line 121 by the by-pass valve 125 during the active cooling mode, so that during the active cooling mode no lubricant oil can pass through the by-pass valve 125.

Due to said complete closure of the fluid by-pass line 121 in the active cooling mode, lubricant oil can exit the fluid by-pass line 121 only during the passive cooling mode, when the by-pass valve 125 is opened, so that the lubricant oil in the passive cooling mode flows through the opened by-pass valve 125, through the fluid by-pass line 121 into the first fluid line 107 and from there further to the compressor 105.

The direction of flow of the lubricant oil 133 is highlighted by dashed arrows in FIG. 3.

In particular the direction of flow of the lubricant oil 133 through the fluid by-pass line 121 is opposite to the direction of flow of the cooling agent 131 through the fluid by-pass line 121 in the passive cooling mode.

Alternatively, an at least partial closure of the fluid by-pass line 121 by the by-pass valve 125 during the active cooling mode comprises a partial closure of the fluid by-pass line 121 by the by-pass valve 125 during the active cooling mode, so that during the active cooling mode lubricant oil can partially pass through the by-pass valve 125.

A partial closure of the fluid by-pass line 121 by the by-pass valve 125 can be achieved in particular by a periodical opening of the by-pass valve 125 during the active cooling mode, so that during said periodical openings lubricant oil can flow through the by-pass valve 125 and through the fluid by-pass line 121 to the first fluid line 107 and back to the compressor 105.

Alternatively, a partial closure of the fluid by-pass line 121 by the by-pass valve 125 in particular can be achieved by a constant partial opening of the by-pass valve 125 during the active cooling mode, so that during said constant partial opening lubricant oil can constantly flow through the by-pass valve 125 and through the fluid by-pass line 121 to the first fluid line 107 and back to the compressor 105.

Said partial closure of the fluid by-pass line 121 by the by-pass valve 125 in particular is achieved such that the by-pass valve 125 is adapted to close the fluid by-pass line 121 in a range between 1% and 99% based on the cross-section of the fluid by-pass line 121, more particular in a range between 50% and 99%, even more particular in a range between 75% and 99%, most particular in a range between 85% and 99%, and even most particular in a range between 95% and 99%.

In particular, the partial closure, i.e. partial opening, of the fluid by-pass line 121 by the by-pass valve 125 is adjusted in such a way that the lubricant oil can flow through the by-pass valve 125 in the direction 133 with the required flow rate while at the same time the flow of gaseous cooling agent through the fluid by-pass line 121 in the opposite direction 131 is minimized during the active cooling mode. In particular, this is achieved by the above-mentioned small percentage of the cross-section of the fluid by-pass line 121, which is opened by the by-pass valve 125.

By the example of the present application, lubricant oil can be continuously returned to the compressor 105 along direction 133 without any additional devices such as conventionally used oil separators. Therefore, the size of the cooling circuit 101 and thereby the size of the cooling device 100 does not have to be increased for oil separation, since the separating portion 123 located between the existing fluid by-pass line 121 and the second fluid line 113 is sufficient for said oil separation.

In other words, the size of the cooling circuit 101 and thereby the size of the cooling device 100 does not have to be increased for oil separation, since the fluid by-pass line 121 can have two functions: A) Function of oil separation and oil transport during the active cooling mode; B) Function of vapor transport from the first fluid line 107 to the second fluid line 113.

As explained in more detail further below, additional oil removal measures for removing lubricant oil from the fluid by-pass line 121 can be employed.

Figure 4:
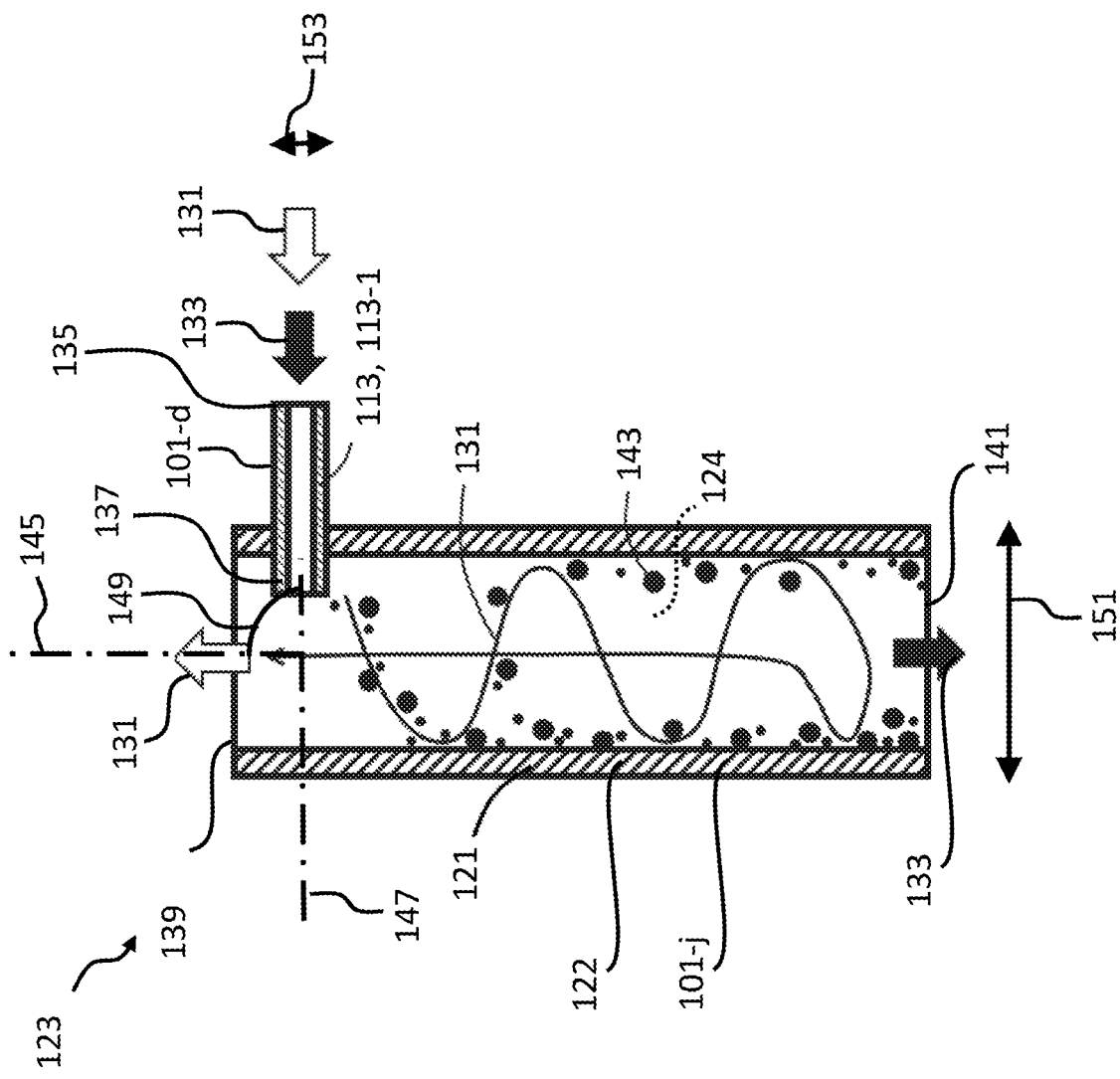
FIGS. 4 and 5 are schematic diagrams of a separating portion of a cooling circuit according to an embodiment of the present disclosure.
Figure 5:
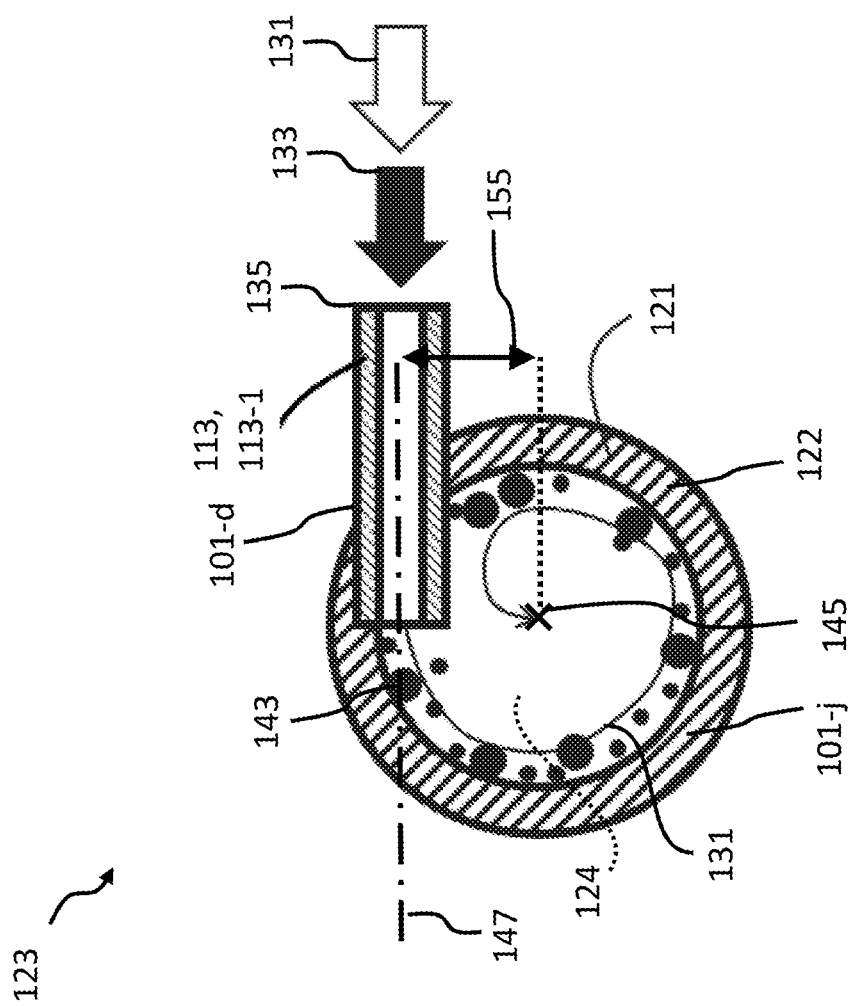

FIGS. 4 and 5 are schematic diagrams of a separating portion 123 of a cooling circuit 101 according to an example. In FIG. 4 said separating portion 123 is shown a side view, while in FIG. 5 said separating portion 123 is shown in a top view.

At the separating portion 123, an end portion 137 of the second fluid line 113 is inserted into the interior 124 of the fluid by-pass line 121, wherein in particular the end portion 137 of the second fluid line 113 penetrates a wall 122 of the fluid by-pass line 121.

As can be derived from FIG. 4, the fluid by-pass line 121 in particular is arranged vertically in the cooling device 100, and the end portion 137 of the second fluid line 113 in particular is arranged horizontally in the cooling device 100.

In particular, a first axis 145 corresponding to the direction of extension of the fluid by-pass line 121 and a second axis 147 corresponding to the direction of extension of the end portion 137 of the second fluid line 113 are arranged with an angle 149 in respect to each other, wherein said angle 149 in particular is 90°.

As can be derived from FIG. 5, the end portion 137 of the second fluid line 113 is inserted into the interior 124 of the fluid by-pass line 121 tangentially in respect to the circumference of the fluid by-pass line 121. Thereby, a second axis 147 corresponding to the direction of extension of the end portion 137 of the second fluid line 113 is arranged at an offset 155 with respect to a first axis 145 corresponding to the direction of extension of the fluid by-pass line 121.

Due to this geometrical orientation of the end portion 137 of the second fluid line 113 in respect to the fluid by-pass line 121 the mixture of lubricant oil and compressed gaseous cooling agent flows through the end portion 137 with a high velocity, and after entering the fluid by-pass line 121 said mixture forms a vortex within the fluid by-pass line 121 thereby changing the direction of flow within the fluid by-pass line 121 as indicated in FIGS. 4 and 5.

While the compressed gaseous cooling agent exits the separating portion 123 at the second fluid connection 139 to the condenser 111, the heavy particles of lubricant oil move downwards in the separating portion 123, mostly at the wall 122 of the fluid by-pass line 121, due to inertia and gravitational forces towards the third fluid connection 141 to the evaporator 103.

Since the velocity of the compressed gaseous cooling agent at the top part of the separating portion 123 is low, the compressed gaseous cooling agent cannot push the lubricant oil towards the second fluid connection 139 to the condenser 111, so that an efficient oil separating effect is achieved within the separating portion 123.

In particular, the diameter 151 of the fluid by-pass line 121 is greater than the diameter 153 of the second fluid line 113.

Figure 6:
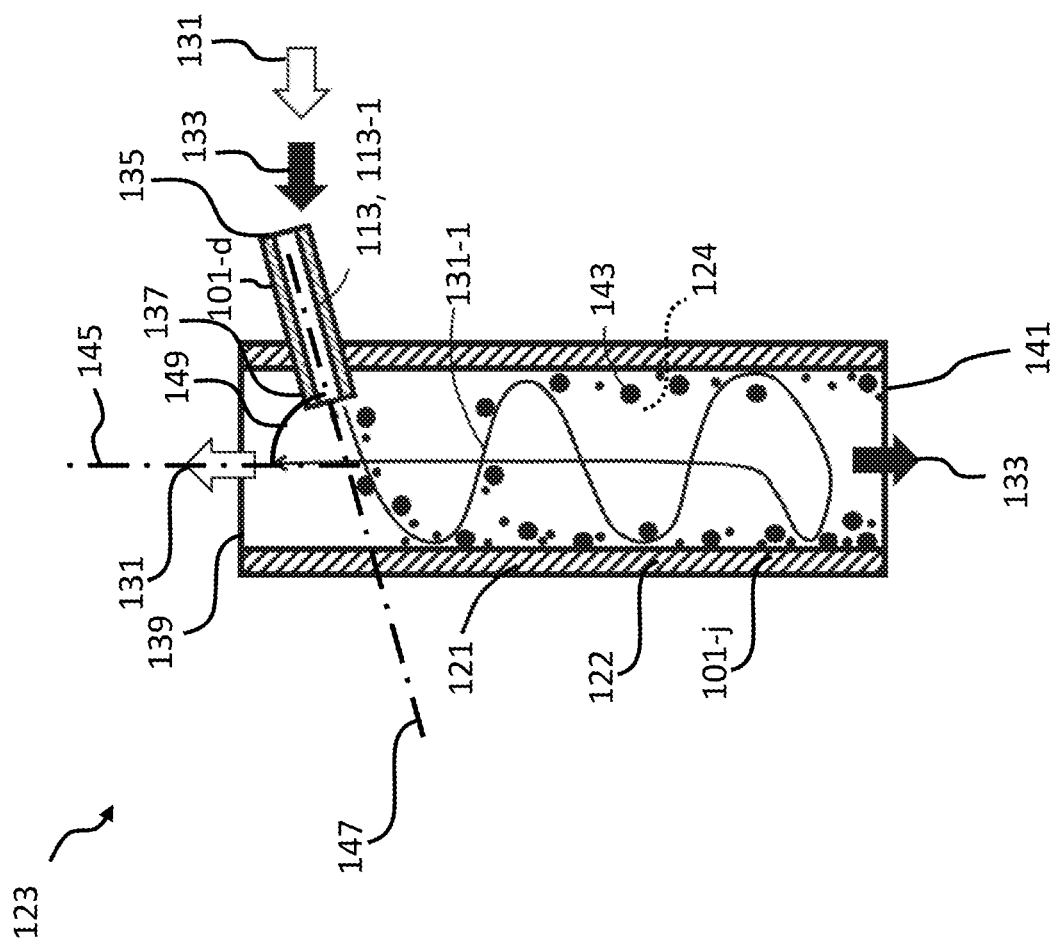
FIG. 6 is a schematic diagram of a separating portion of a cooling circuit according to an embodiment of the present disclosure.

FIG. 6 is a schematic diagram of a separating portion 123 of a cooling circuit 101 according to an example.

In contrast to FIG. 4, wherein the end portion 137 of the second fluid line 113 is arranged horizontally, in FIG. 5, a first axis 145 corresponding to the direction of extension of the fluid by-pass line 121 and a second axis 147 corresponding to the direction of extension of the end portion 137 of the second fluid line 113 are arranged with an angle 149 in respect to each other, wherein said angle 149 in particular is between 15° and 89°.

As a consequence of this specific angle 149, the mixture of lubricant oil and compressor 105 gaseous cooling agent enters the fluid by-pass line 121 mostly in a direction towards the third fluid connection 141 towards the evaporator 103, so that oil particles 143 move to the area of oil collection due to gravitational effects and also to a significant part due to inertia.

Figure 7:
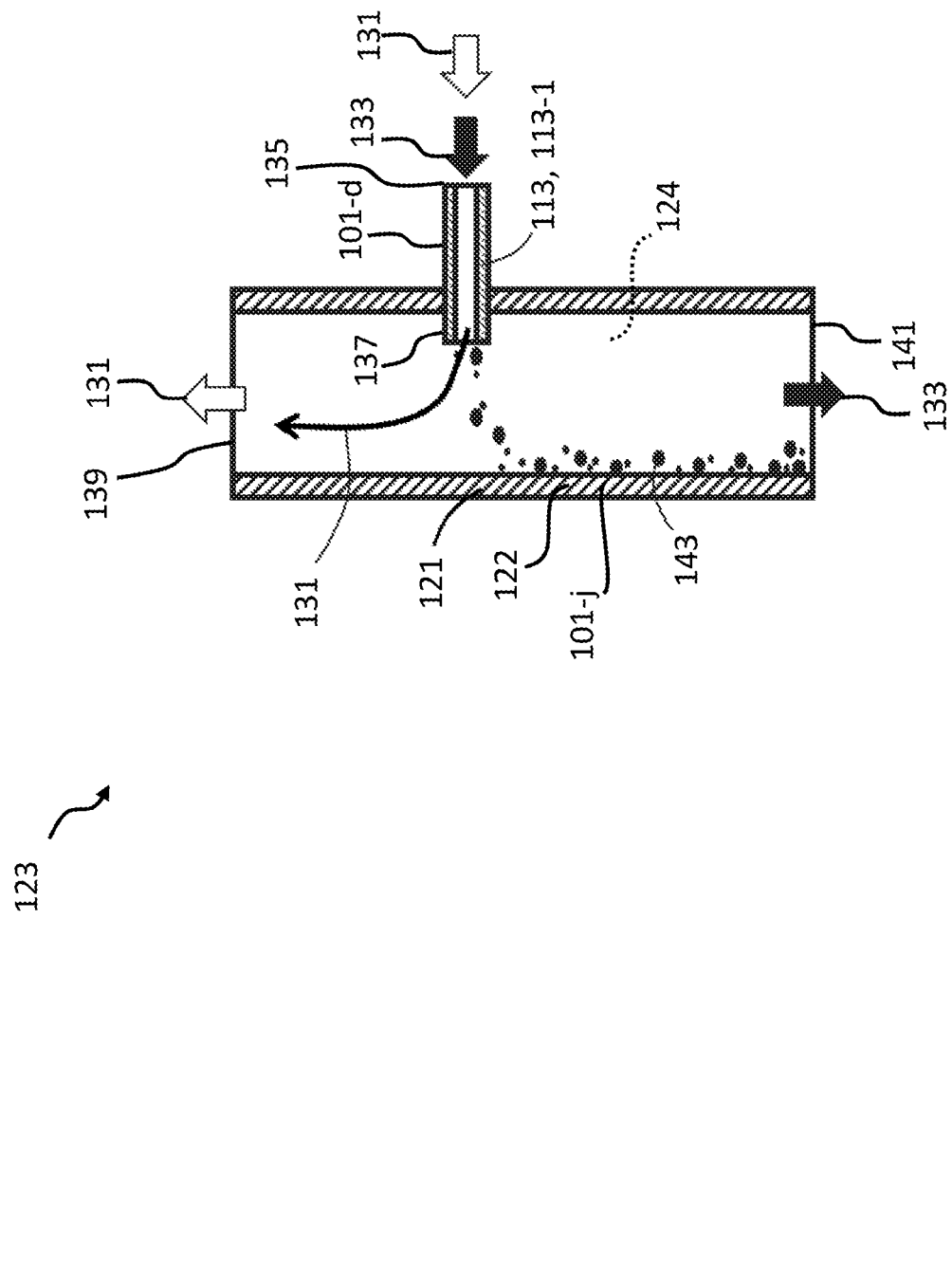
FIGS. 7 and 8 are schematic diagrams of a separating portion of a cooling circuit according to an embodiment of the present disclosure.
Figure 8:
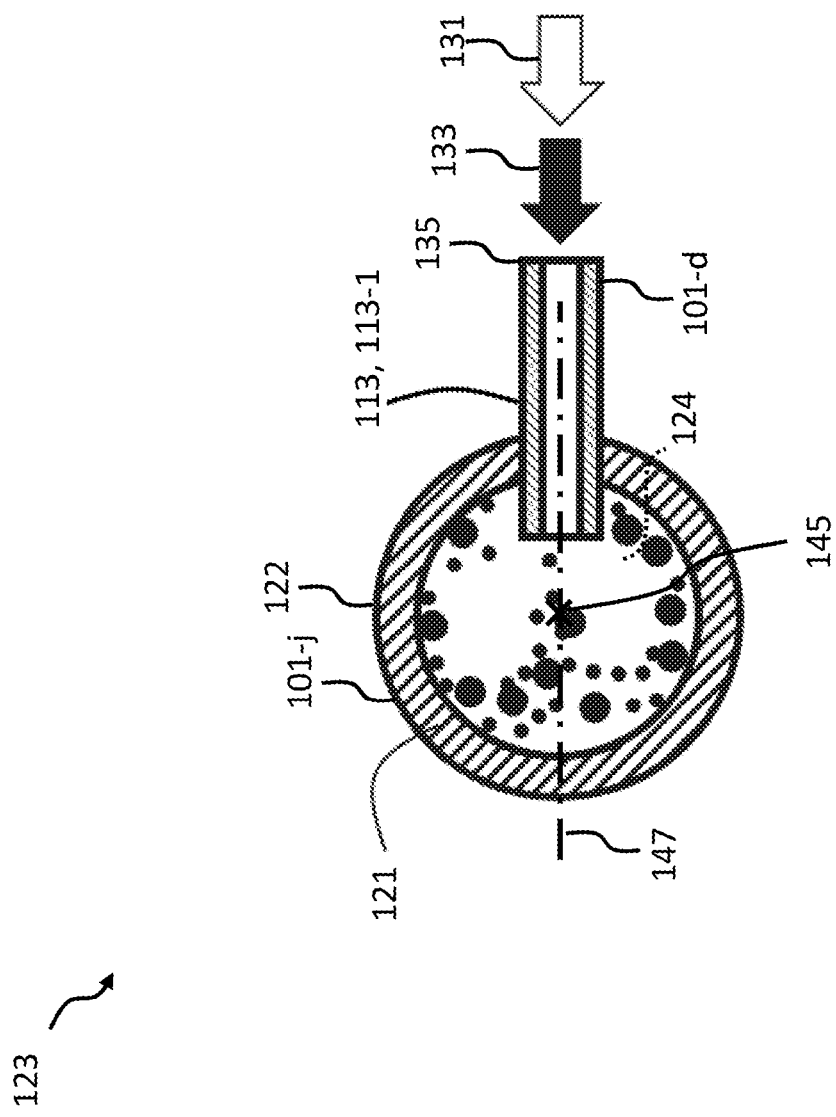

FIGS. 7 and 8 are schematic diagrams of a separating portion 123 of a cooling circuit 101 according to an example.

In contrast to FIGS. 4 and 5, wherein the end portion 137 of the second fluid line 113 is inserted into the interior 124 of the fluid by-pass line 121 tangentially in respect to the circumference of the fluid by-pass line 121, in FIGS. 7 and 8, said end portion 137 is positioned centrally within the fluid by-pass line 121.

Therefore, as shown in FIG. 8 a second axis 147 corresponding to the direction of extension of the end portion 137 of the second fluid line 113 intersects a first axis 145 corresponding to the direction of extension of the fluid by-pass line 121.

Due to this configuration, the oil particles 143 move to the wall 122 of the fluid by-pass line 121 and move downward mostly due to gravitational forces. The flow velocity of the compressed gaseous cooling agent in the direction of the second fluid connection 139 to the condenser 111 is low and thereby the oil particles 143 cannot be pushed towards the condenser 111.

Figure 9:
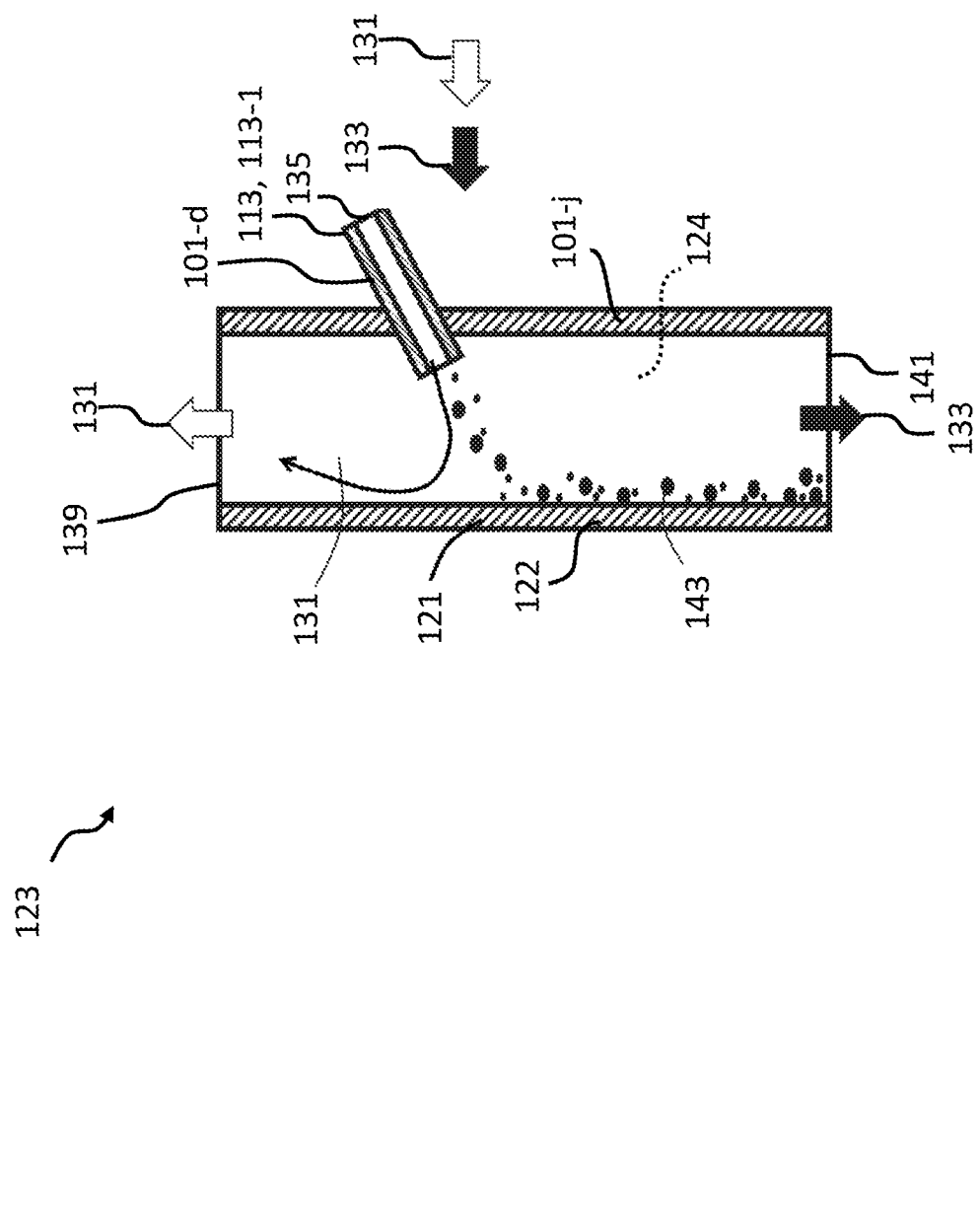
FIG. 9 is a schematic diagram of a separating portion of a cooling circuit according to an embodiment of the present disclosure.

FIG. 9 is a schematic diagram of a separating portion 123 of a cooling circuit 101 according to an example.

In FIG. 9, the end portion 137 of the second fluid line 113 is inserted non-tangentially into the interior 13 of the fluid by-pass line 121 similar to the example shown in FIGS. 7 and 8.

At the same time in FIG. 9, the angle 149, in particular between 15° and 89°, is formed between a first axis 145 corresponding to the direction of extension of the fluid by-pass line 121 and a second axis 147 corresponding to the direction of extension of the end portion 137 of the second fluid line 113 similar to the example shown in FIG. 6.

Thereby, oil particles 143 move to the wall 122 of the fluid by-pass line 121 due to inertia and further down the wall 122 due to gravitational forces.

Figure 10:
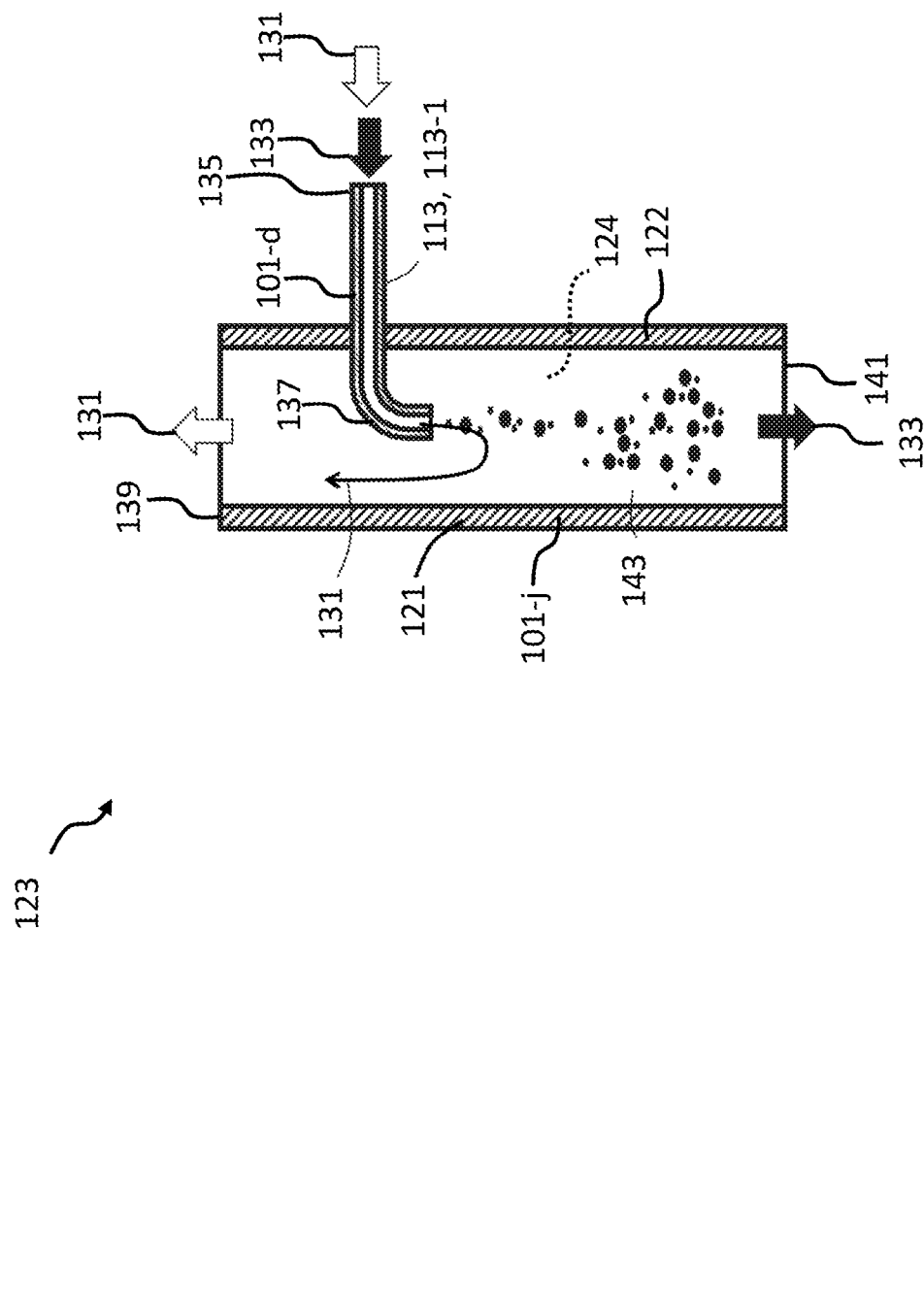
FIG. 10 is a schematic diagram of a separating portion of a cooling circuit according to an embodiment of the present disclosure.

FIG. 10 is a schematic diagram of a separating portion 123 of a cooling circuit 101 according to an example.

In FIG. 10, the end portion 137 of the second fluid line 113 is bent, in particular is bent towards the third fluid connection 141 towards the evaporator 103.

By this bent arrangement of the end portion 137 of the second fluid line 113, the direction of flow of the mixture of lubricant oil and compressed gaseous cooling agent entering the fluid by-pass line 121 is opposite to the second fluid connection 139 to the condenser 111. Therefore, an efficient separation of lubricant oil and compressed gaseous cooling agent is achieved.

Figure 11:
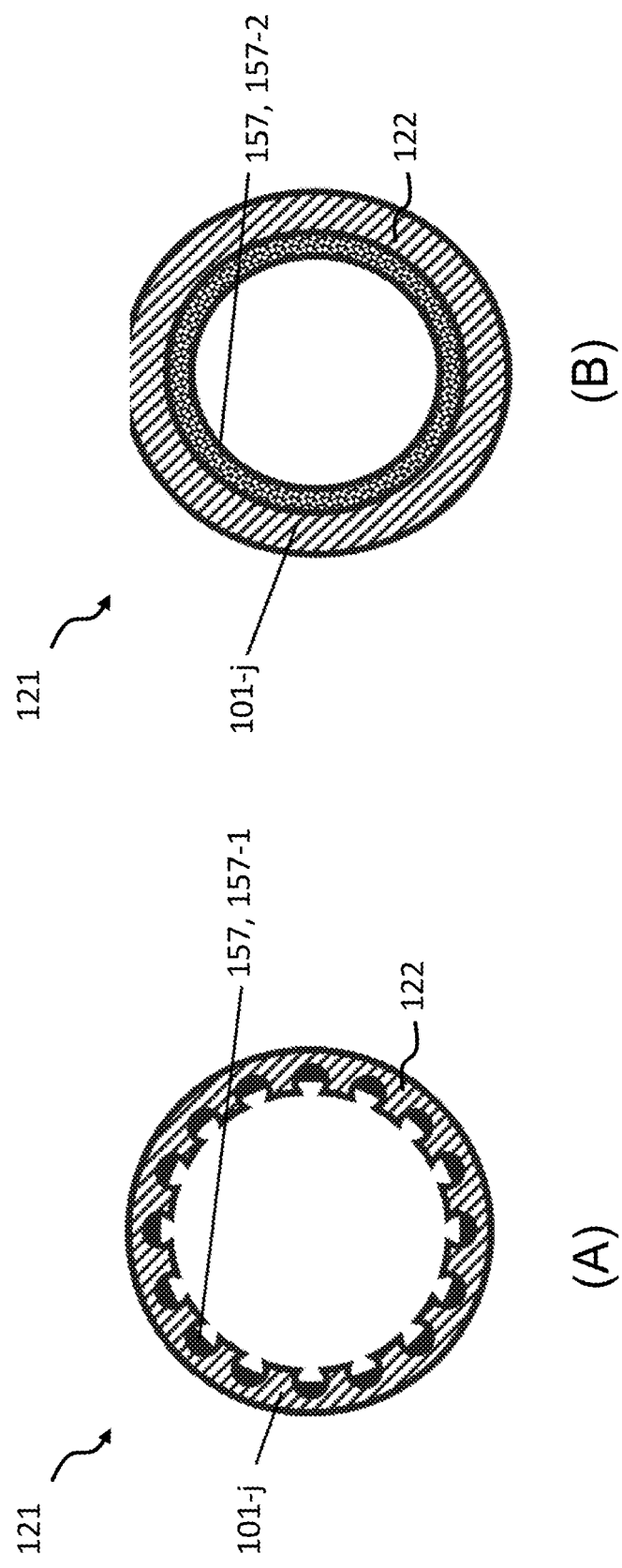
FIGS. 11A and 11B are schematic diagrams of a fluid by-pass line of a cooling circuit according to an embodiment of the present disclosure.

FIGS. 11A and 11B are schematic diagrams of a fluid by-pass line 121 of a cooling circuit 101 according to an example.

In FIGS. 11A and 11B a respective cross-section of a wall 122 of the respective fluid by-pass line 121 is shown, wherein a respective oil conveying element 157 is arranged.

The oil conveying element 157 in particular is arranged in the fluid by-pass line 121 at least partially between the by-pass valve 125 and the separating portion 123.

According to FIG. 11A, the oil conveying element 157 is formed as a plurality of grooves 157-1, and according to FIG. 11A, the oil conveying element 157 is formed from a porous material 157-2, wherein the porous material 157-2 can be a porous coating, a screen mesh, sintered particles, and the like.

Oil particles 143 of lubricant oil entering the fluid by-pass line 121 are absorbed by the grooves 157-1 and/or the porous material 157-2 due to capillary forces, wherein the lubricant oil subsequently moves inside the grooves 157-1 and/or the porous material 157-2 to the respective oil collecting areas due to gravitational forces and/or capillary forces.

Since the lubricant oil is inside the grooves 157-1 and/or the porous material 157-2, capillary forces from the surface of the grooves 157-1 and/or the porous material 157-2 prevent entrainment of oil from the surface by the stream of gaseous cooling agent within the fluid by-pass line 121, so that the gaseous cooling agent cannot push the absorbed lubricant oil to the second fluid connection 139 to the condenser 111.

Therefore, the oil conveying element 157, in particular the grooves 157-1 and/or the porous material 157-2 is adapted to transport the absorbed lubricant oil towards the third fluid connection 141 to the evaporator 103.

Figure 12:
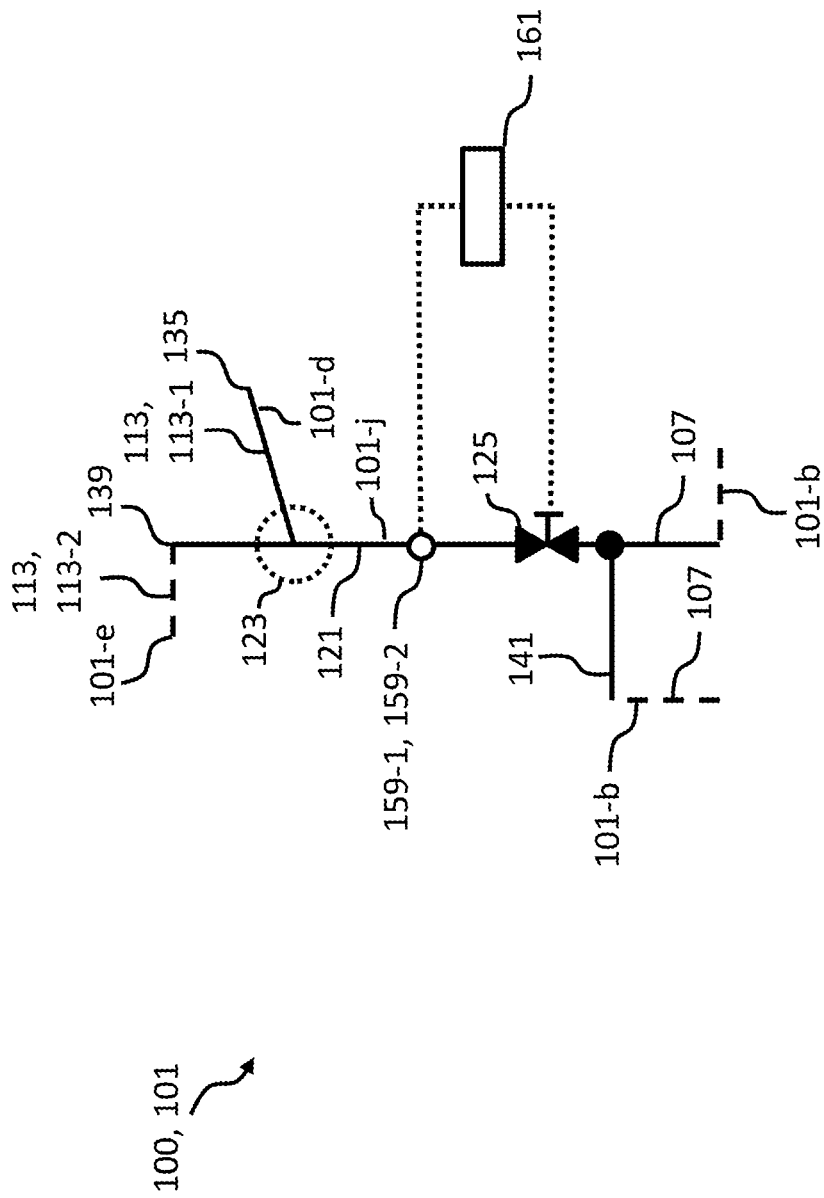
FIG. 12 is a schematic diagram of a section of a cooling circuit according to an embodiment of the present disclosure.

FIG. 12 is a schematic diagram of a section of a cooling circuit 101 according to an example.

In FIG. 12 a fluid by-pass line 121 of a cooling circuit 101 of the cooling device 100 is schematically shown, wherein said fluid by-pass line 121 connects the first fluid line 107 with the second fluid line 113. For more details, reference to the previous figures is provided.

The fluid by-pass line 121 comprises an oil level sensor 159-1, which is adapted to detect a level of lubricant oil collected in the fluid by-pass line 121, and/or a flow rate sensor 159-2, which is adapted to detect a flow rate of lubricant oil flowing in the fluid by-pass line 121. Optionally, the oil level sensor 159-1 and/or flow rate sensor 159-2 can be positioned within the by-pass valve 125.

A control 161 of the cooling device 100 is adapted to operate the by-pass valve 125 in dependence of the detected level of lubricant oil and/or in dependence of the detected flow rate of lubricant oil during the active cooling mode.

In particular, the control 161 is adapted to switch the by-pass valve 125 between a first valve position for completely closing the fluid by-pass line 121 to a second valve position for completely opening the fluid by-pass line 121, if the level of lubricant detected by the oil level sensor 159-1 increases above a level threshold.

This means that in the first valve position the fluid by-pass line 121 is completely closed, while in the second valve position the fluid by-pass line 121 is completely opened. In particular, intermediate valve positions between the first and second valve positions can be switched by the control 161 to allow for a partial closure, i.e. partial opening of the by-pass valve 125, in order to control the flow-rate of lubricant oil flowing through the by-pass valve 125.

Said partial closure, i.e. partial opening of the fluid by-pass line 121 is achieved the by decreasing the cross-section of the fluid by-pass line 121 between 1% and 99%, in particular between 50% and 99%, more particular between 75% and 99%, even more particular between 85% and 88%, and most particular between 95% and 99%.

For example, if the level of lubricant oil detected by oil level sensor 159-1 exceeds a level threshold, the control 161 is adapted to at least partially open the fluid by-pass line 121 to allow for lubricant oil to be released from the fluid by-pass line 121. For example, if the cross-section of the fluid by-pass line 121 is opened for 5%, which means that the by-pass valve 125 decreases the cross-section of the fluid by-pass line 121 by 95%, a constant flow of lubricant oil through the partially opened by-pass valve 125 is achieved.

During this oil flow process, for example, the flow rate of lubricant oil can be detected with the flow rate sensor 159-2, and the control 161 can adjust the partial opening of the fluid by-pass line 121 depending on the detected flow rate by switching the by-pass valve 125 in correspondence. For example, the previous opening of the cross-section of the fluid by-pass line of 5% can be increased to 10%, if the detected flow rate is below an optimal flow rate.

Depending on the design of the by-pass valve 125 it is possible to adjust different flow rates of lubricant oil through the by-pass valve 125 when said by-pass valve 125 comprises different channels through which the oil can flow.

In particular, the control 161 is adapted to switch the by-pass valve 125 between a second valve position for completely opening the fluid by-pass line 121 to a first valve position for completely closing the fluid by-pass line 121 if the detected flow rate of lubricant oil increases above a flow rate threshold during the active cooling mode.

The flow rate threshold for example indicates an end point of the lubricant oil released from the fluid by-pass line 121. Therefore, if the flow rate of oil passing through the fluid by-pass line is so large, that the content of lubricant oil downstream of the fluid-by pass line 121 is too high, the fluid by-pass line 121 can be closed.

Figure 13:
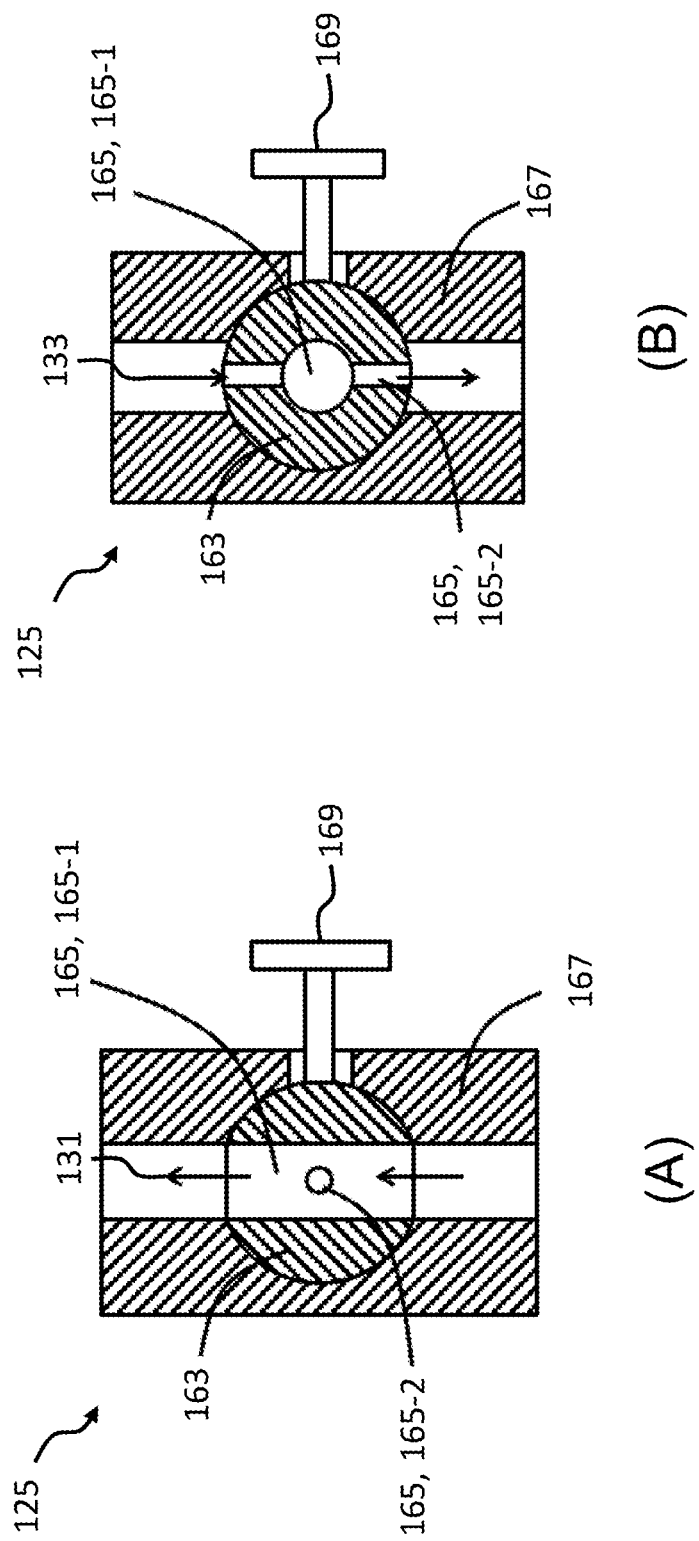
FIGS. 13A and 13B are schematic diagrams of a by-pass valve of a cooling circuit according to an embodiment of the present disclosure.

FIGS. 13A and 13B are schematic diagrams of a by-pass valve 125 of a cooling circuit 101 according to an example.

The by-pass valve 125 shown in FIGS. 13A and 13B is formed as a ball valve comprising a ball element 163, which is received in a ball housing 167.

The ball element 163 is rotatable between a first rotation position, which is depicted in FIG. 13A, and a second rotation position, which is depicted in FIG. 13B.

In particular, the first rotation position corresponds to the operation of the cooling device 100 during the passive cooling mode, and the second rotation position corresponds to the operation of the cooling device 100 during the active cooling mode. In particular, any intermediate position between the first rotation position and the second rotation position corresponds to the operation of the cooling device 100 during the active cooling mode with a partial opening of the ball valve 125.

In particular, the first and second rotation position are perpendicular with respect to each other.

In particular, the ball element 163 comprises a rotation shaft 169, which penetrates the ball housing 167, wherein the rotation shaft 169 is drivable by a motor of the ball valve in order to rotate the ball element 163 between the first rotation position and the second rotation position.

The ball element 163 comprises a first channel 165-1 for conducting cooling agent through the ball element 163 in the first rotation position of the ball element 163, and a second channel 165-2 for conducting lubricant oil through the ball element 163 in the second rotation position of the ball element 163.

The second channel 165-2 of the ball element 163 is sealed off by the ball housing 167 in the first rotation position of the ball element 163, so that in the first rotation position of the ball element 163, the cooling agent is conducted through the first channel 165-1 of the ball element 163. Reference is provided to the direction of flow of the cooling agent 131 indicated in FIG. 13A with arrows.

The first channel 165-1 of the ball element 163 is sealed off by the ball housing 167 in the second rotation position of the ball element 163, so that in the second rotation position of the ball element 163, the lubricant oil is conducted through the second channel 165-2 of the ball element 163. Reference is provided to the direction of flow of lubricant oil 133 indicated in FIG. 13B with arrows.

In the particular, the rotation of the ball element 163 between the first rotation position and the second rotation position also comprises intermediate positions of the ball element 163, so that the flow rate of lubricant oil flowing through the second channel 165-2 and/or cooling agent flow through the first channel 165-1 can be controlled by partially opening e.g. by partially closing the second channel 165-2 and/or first channel 165-1.

In particular, the diameter of the first channel 165-1 is greater than the diameter of the second channel 165-2 to allow for an efficient low-resistance flow of cooling agent through the first channel 165-1 during the passive cooling mode. Due to the smaller diameter of the second channel 165-2, the flow-resistance is high and a significant by-pass flow of gaseous cooling agent through the second channel 165-2 during the active cooling mode can be prevented.

In particular the first channel 165-1 and second channel 165-2 extend perpendicular with respect to each other through the ball element 163. In particular the first and second channel 165-1, 165-2 intersect each other in the ball element 163.

Figure 14:
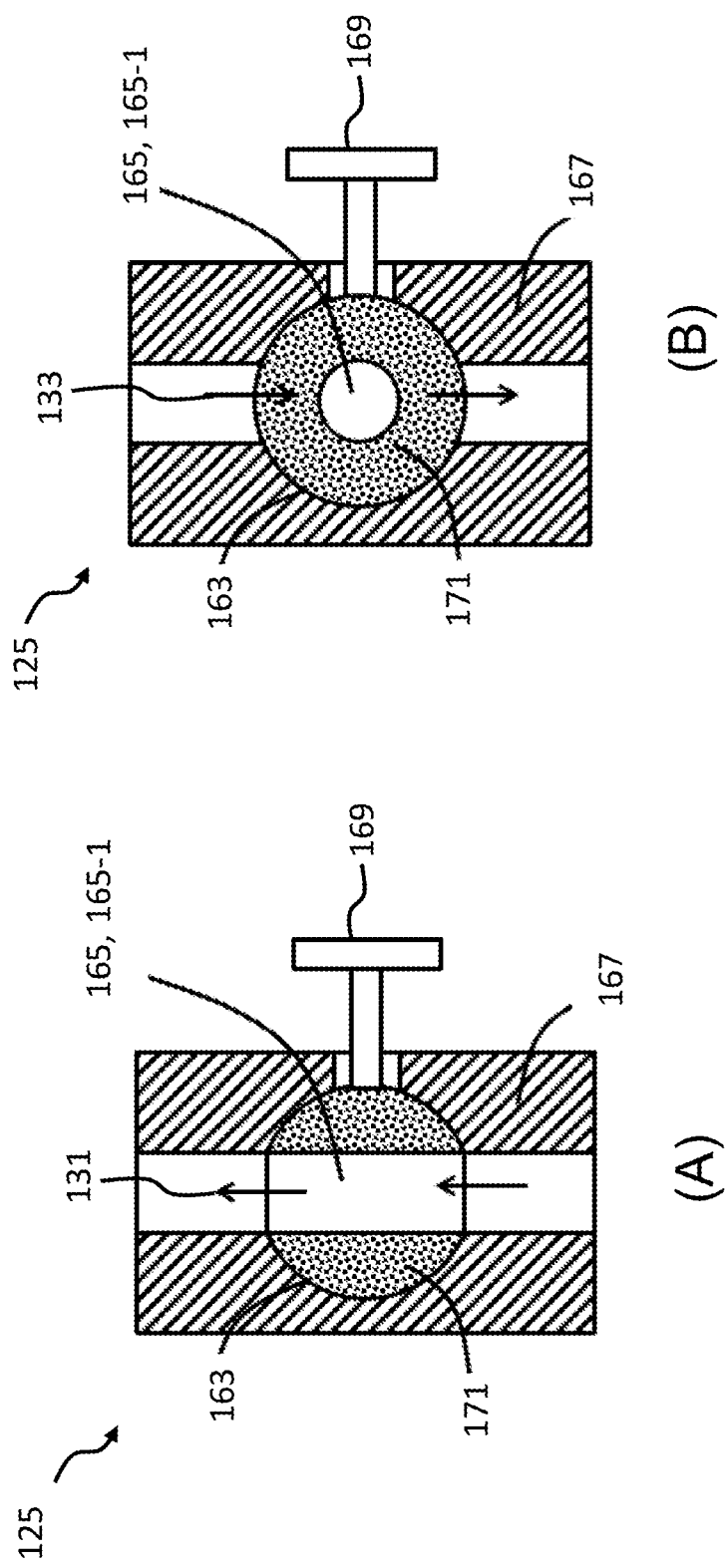
FIGS. 14A and 14B are schematic diagrams of a by-pass valve of a cooling circuit according to an embodiment of the present disclosure.

FIGS. 14A and 14B are schematic diagrams of a by-pass valve 125 of a cooling circuit 101 according to an example.

The by-pass valve 125 shown in FIGS. 14A and 14B is similar to the by-pass valve 125 shown in FIGS. 13A and 13B except for the following differences.

The by-pass valve 125 shown in FIGS. 14A and 14B does not have a second channel 165-2 for conducting lubricant oil. Instead the ball element 163 of the by-pass valve 125 is formed from porous material 171. Consequently, in the second rotation position shown in FIG. 14B, lubricant oil can be transferred through the porous material 171 of the ball element 163 to allow for an efficient oil transport.

Figure 15:
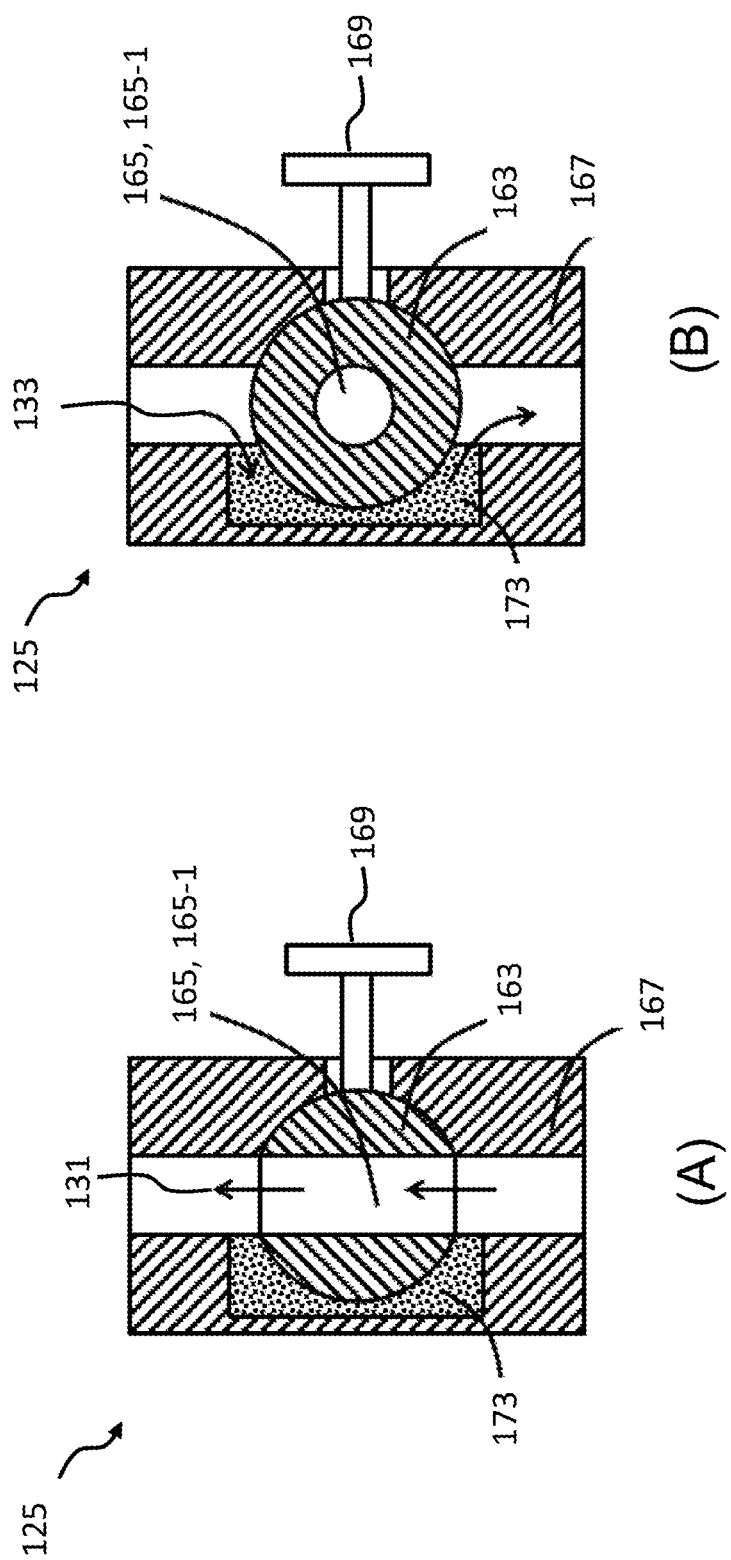
FIGS. 15A and 15B are schematic diagrams of a by-pass valve of a cooling circuit according to an embodiment of the present disclosure.

FIGS. 15A and 15B are schematic diagrams of a by-pass valve 125 of a cooling circuit 101 according to an example.

The by-pass valve 125 shown in FIGS. 15A and 15B is similar to the by-pass valve 125 shown in FIGS. 13A and 13B except for the following differences.

The by-pass valve 125 shown in FIGS. 15A and 15B does not have a second channel 165-2 for conducting lubricant oil. Instead the ball housing 167 of the by-pass valve 125 is formed at least partially from porous material 173. Consequently, both in the first and second rotation position shown in FIGS. 15A and 15B, respectively, lubricant oil can be transferred through the porous material 173 of the ball housing 167 to allow for an efficient oil transport.

Figure 16:
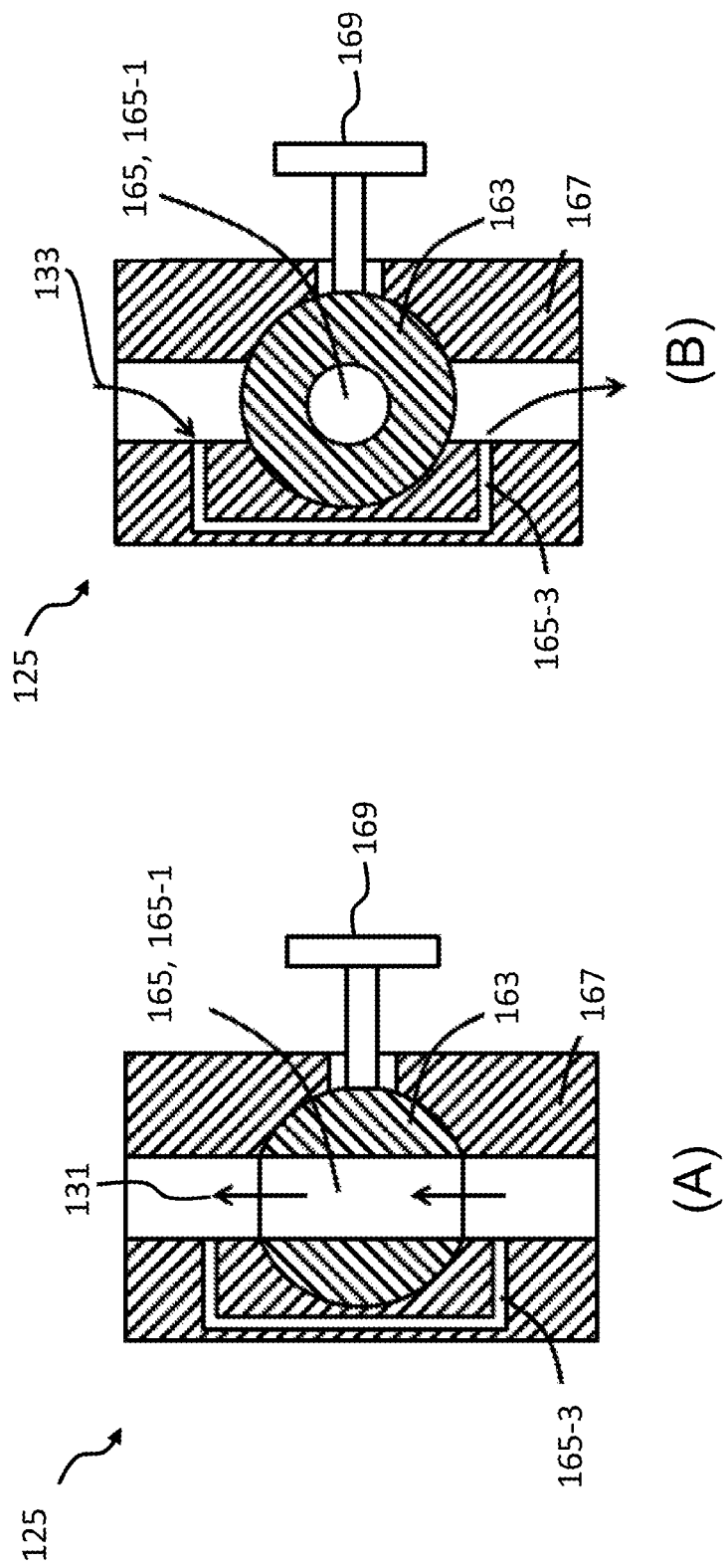
FIGS. 16A and 16B are schematic diagrams of a by-pass valve of a cooling circuit according to an embodiment of the present disclosure.

FIGS. 16A and 16B are schematic diagrams of a by-pass valve 125 of a cooling circuit 101 according to an example.

The by-pass valve 125 shown in FIGS. 16A and 16B is similar to the by-pass valve 125 shown in FIGS. 13A and 13B except for the following differences.

The by-pass valve 125 shown in FIGS. 16A and 16B does not have a second channel 165-2 for conducting lubricant oil. Instead the ball housing 167 of the by-pass valve 125 comprises a third channel 165-3, in particular microchannel 165-3, for conducting lubricant oil through the ball housing 167. In particular, the diameter of the third channel 165-3, in particular microchannel 165-3, is smaller than the diameter of the first channel 165-1. Consequently, both in the first and second rotation position shown in FIGS. 16A and 16B, respectively, lubricant oil can be transferred through the third channel 165-3 of the ball housing 167 to allow for an efficient oil transport.

Figure 17:
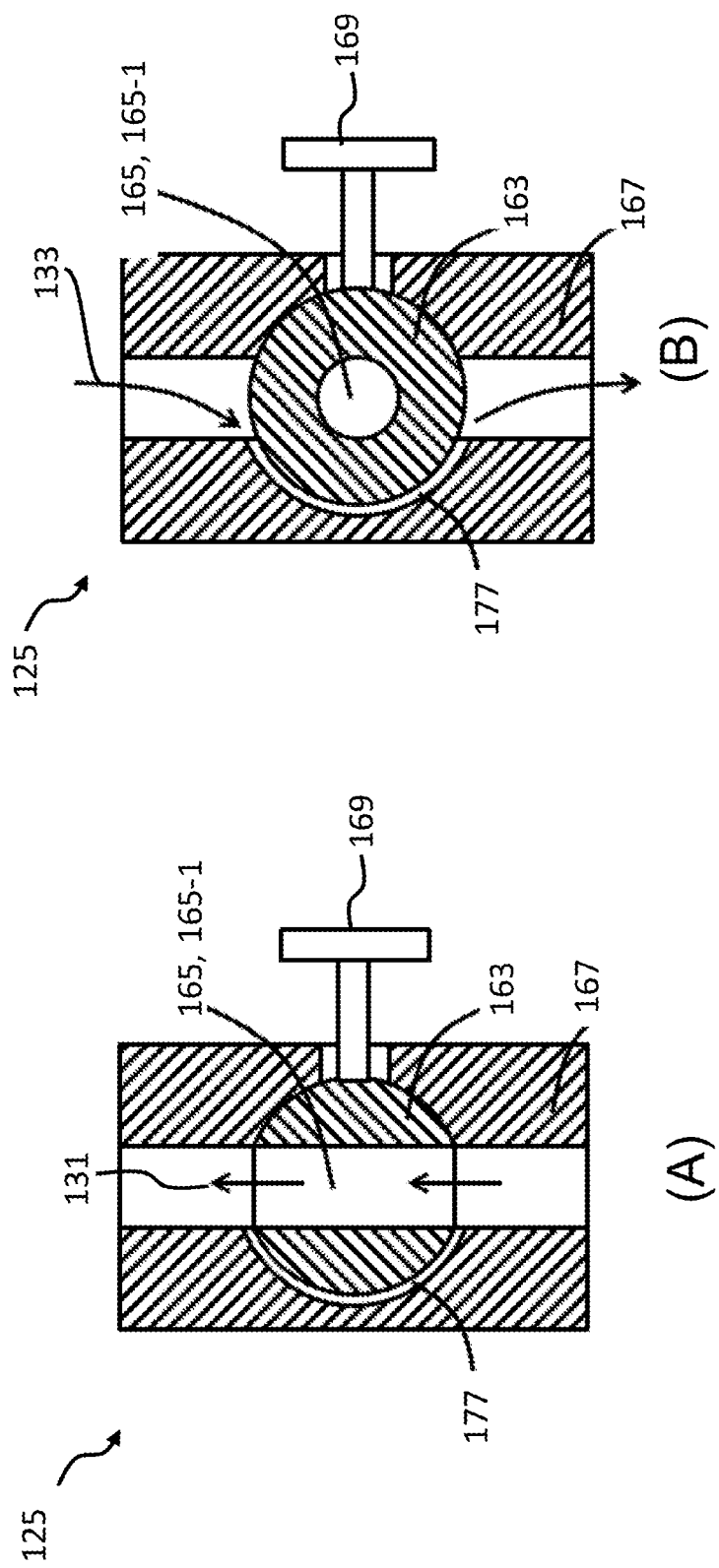
FIGS. 17A and 17B are schematic diagrams of a by-pass valve of a cooling circuit according to an embodiment of the present disclosure.

FIGS. 17A and 17B are schematic diagrams of a by-pass valve 125 of a cooling circuit 101 according to an example.

The by-pass valve 125 shown in FIGS. 17A and 17B is similar to the by-pass valve 125 shown in FIGS. 13A and 13B except for the following differences.

The by-pass valve 125 shown in FIGS. 17A and 17B does not have a second channel 165-2 for conducting lubricant oil. Instead the ball housing 167 of the by-pass valve 125 comprises a third groove 177, which together with the ball element 163 forms a passage for conducting lubricant oil through the ball housing 167. Consequently, both in the first and second rotation position shown in FIGS. 17A and 17B, respectively, lubricant oil can be transferred through the third groove 177 of the ball housing 167 to allow for an efficient oil transport.

Figure 18:
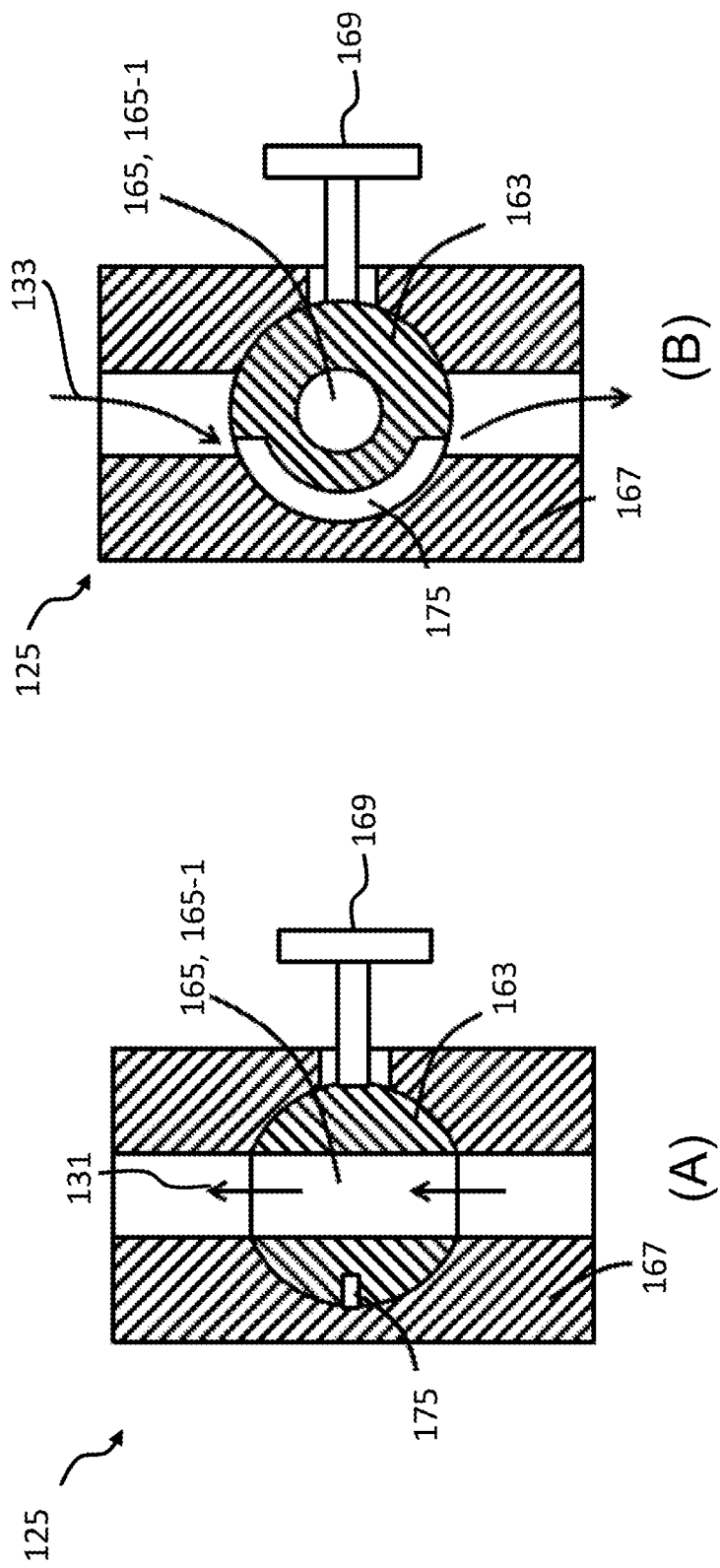
FIGS. 18A and 18B are schematic diagrams of a by-pass valve of a cooling circuit according to an embodiment of the present disclosure.

FIGS. 18A and 18B are schematic diagrams of a by-pass valve 125 of a cooling circuit 101 according to an example.

The by-pass valve 125 shown in FIGS. 18A and 18B is similar to the by-pass valve 125 shown in FIGS. 13A and 13B except for the following differences.

The by-pass valve 125 shown in FIGS. 18A and 18B does not have a second channel 165-2 for conducting lubricant oil. Instead the ball element 163 of the by-pass valve 125 comprises a second groove 175, which together with the ball housing 167 forms a passage for conducting lubricant oil through the ball element 163 in the second rotation position. Consequently, in the second rotation position shown in FIG. 18B lubricant oil can be transferred through the second groove 175 of the ball element 163 to allow for an efficient oil transport.

Figure 19:
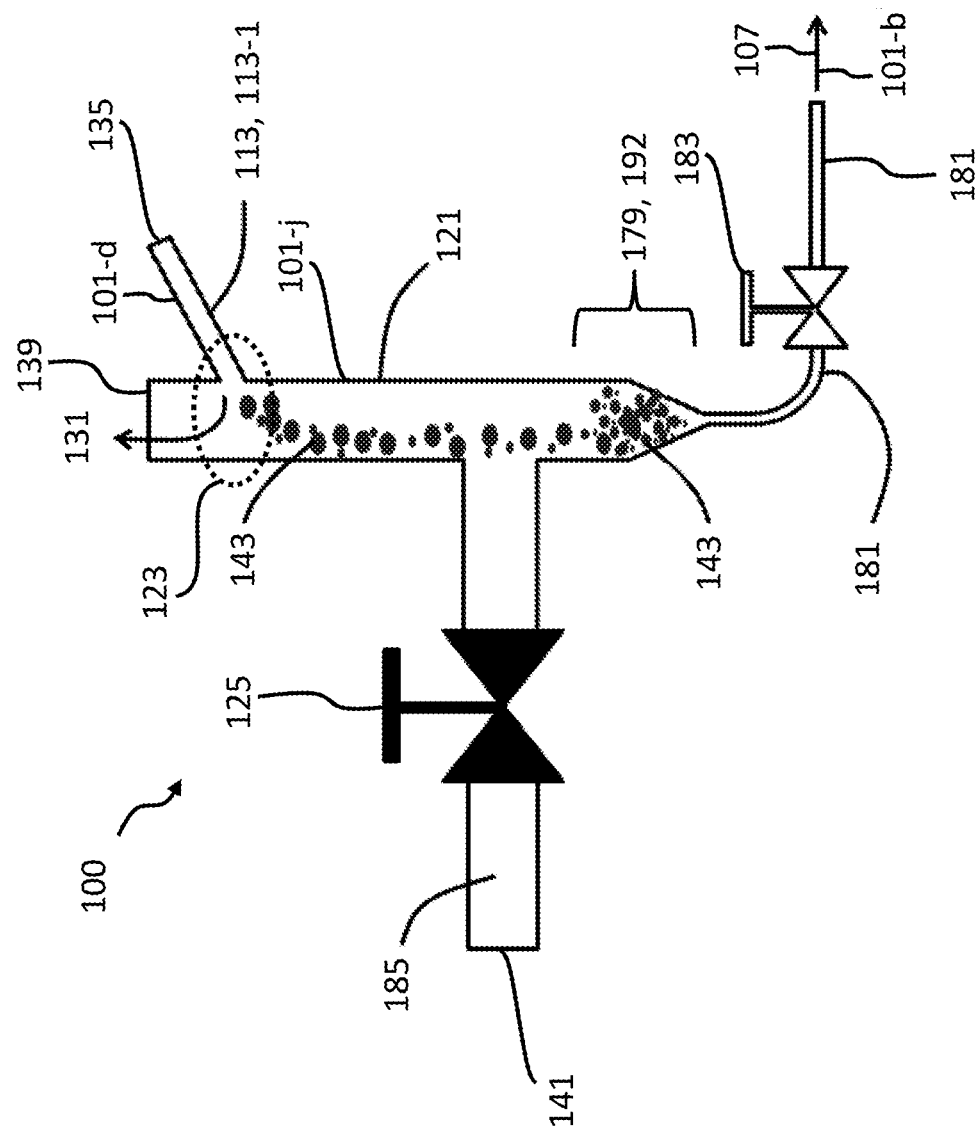
FIG. 19 is a schematic diagram of an oil collection portion of a cooling circuit according to an embodiment of the present disclosure.

FIG. 19 is a schematic diagram of an oil collection portion of a cooling circuit 101 according to an example.

In FIG. 19 only a schematic portion of the fluid by-pass line 121 of a cooling circuit 101 of a cooling device 100 is shown, wherein said fluid by-pass line 121 comprises a third fluid connection 141 to the evaporator 103 and a second fluid connection 139 to the condenser 111.

In a separating portion 123, a second fluid line 113, which forms a first fluid connection 135 to the compressor 105, is connected to the fluid by-pass line 121. At the separating portion 123 the lubricant oil is physically separated from the gaseous cooling agent, so that oil particles 143 flow downwards within the vertically oriented fluid by-pass line 121 as shown in FIG. 19.

In particular, the fluid by-pass line 121 comprises a cooling agent inserting portion 185 through which the cooling agent from the first fluid line 107 can enter the fluid by-pass line 121 in the passive cooling mode. In particular the cooling agent inserting portion 185 is connected to the fluid by-pass line 121 at a location between the separating portion 123 and the oil collecting portion 179 as shown in FIG. 19.

The fluid by-pass line 121 comprises an oil collecting portion 179 for collecting lubricant oil in the fluid by-pass line 121. In particular, the oil collecting portion 179 is arranged vertically below the separating portion 123. In particular the oil collecting portion 179 comprises a tapering section 192 of the fluid by-pass line 121, wherein in particular the tapering section 192 is formed at a bottom end of the fluid by-pass line 121.

The oil collecting portion 179, in particular tapering section 192, is connected to an oil release line 181, wherein the oil release line 181 is connected to the first fluid line 107, in order to conduct lubricant oil from the oil collecting portion 179, 192 through the oil release line 181 to the first fluid line 107.

In particular, the oil release line 181 comprises a capillary tube or an oil release valve 183 in order to control the flow of lubricant oil through the oil release line 181. The oil release valve 183 is adapted to close the oil release line 181 in order to retain the lubricant oil in the oil collecting portion 179, 192 or to open the oil release line 181 in order to transfer the lubricant oil from the oil collecting portion 179, 192 through the oil release line 181 to the first fluid line 107.

Figure 20:
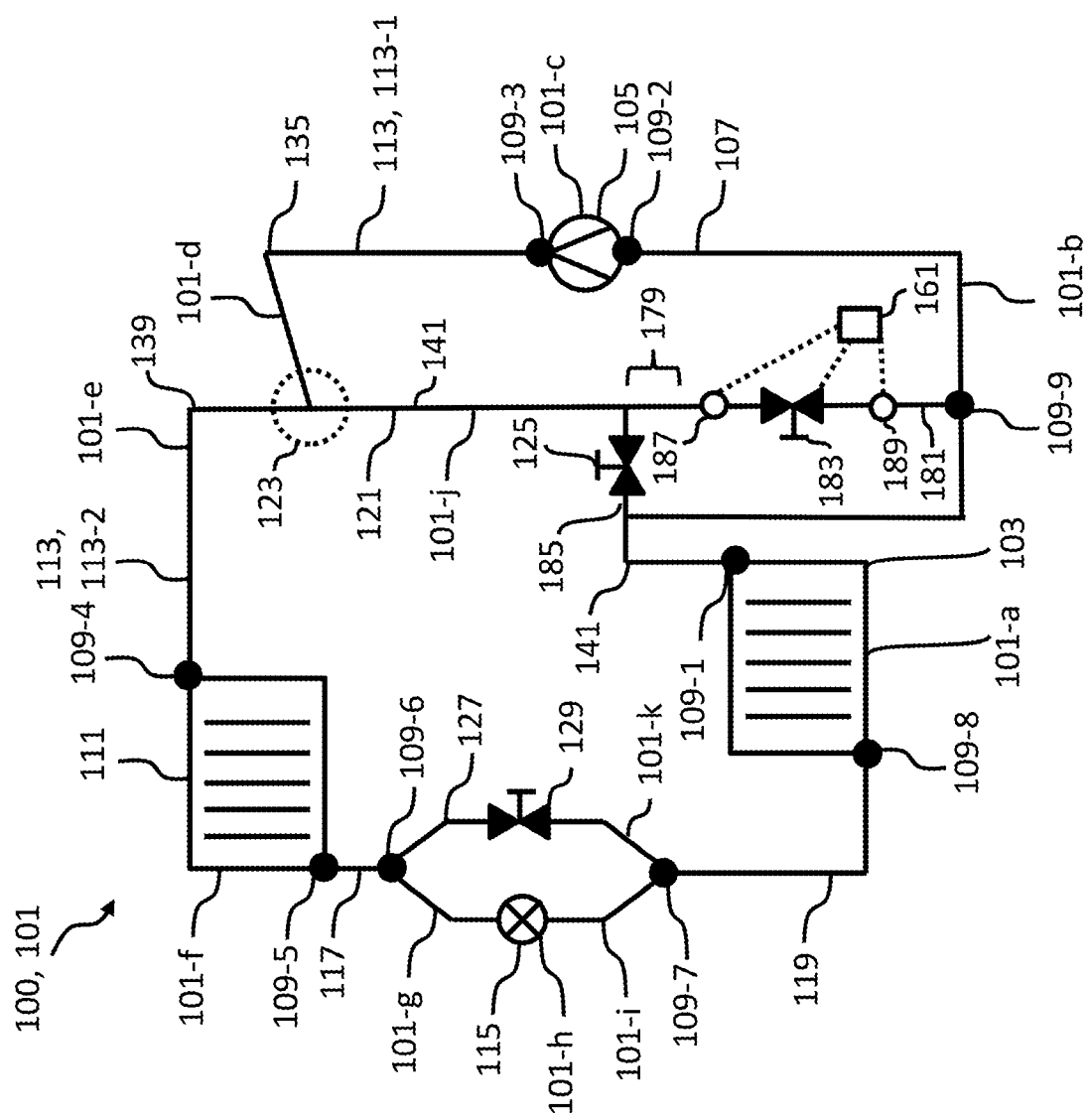
FIG. 20 is a schematic diagram of a cooling circuit according to an embodiment of the present disclosure.
Figure 21:
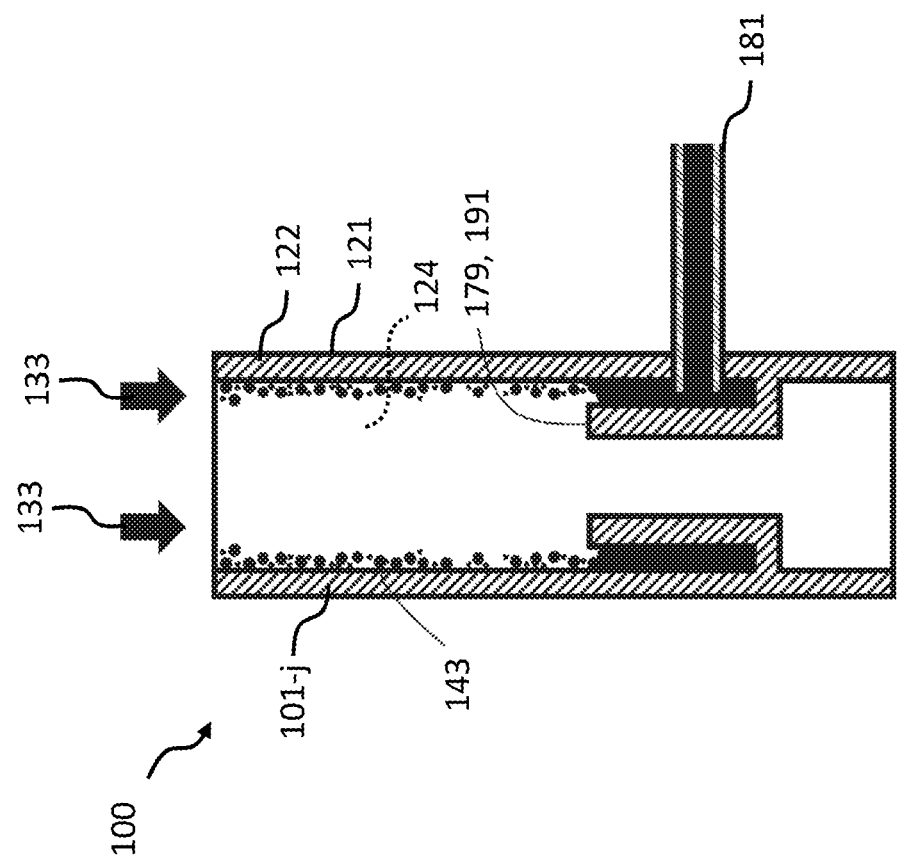
FIG. 21 is a schematic diagram of a fluid by-pass line according to an embodiment of the present disclosure.
Figure 22:
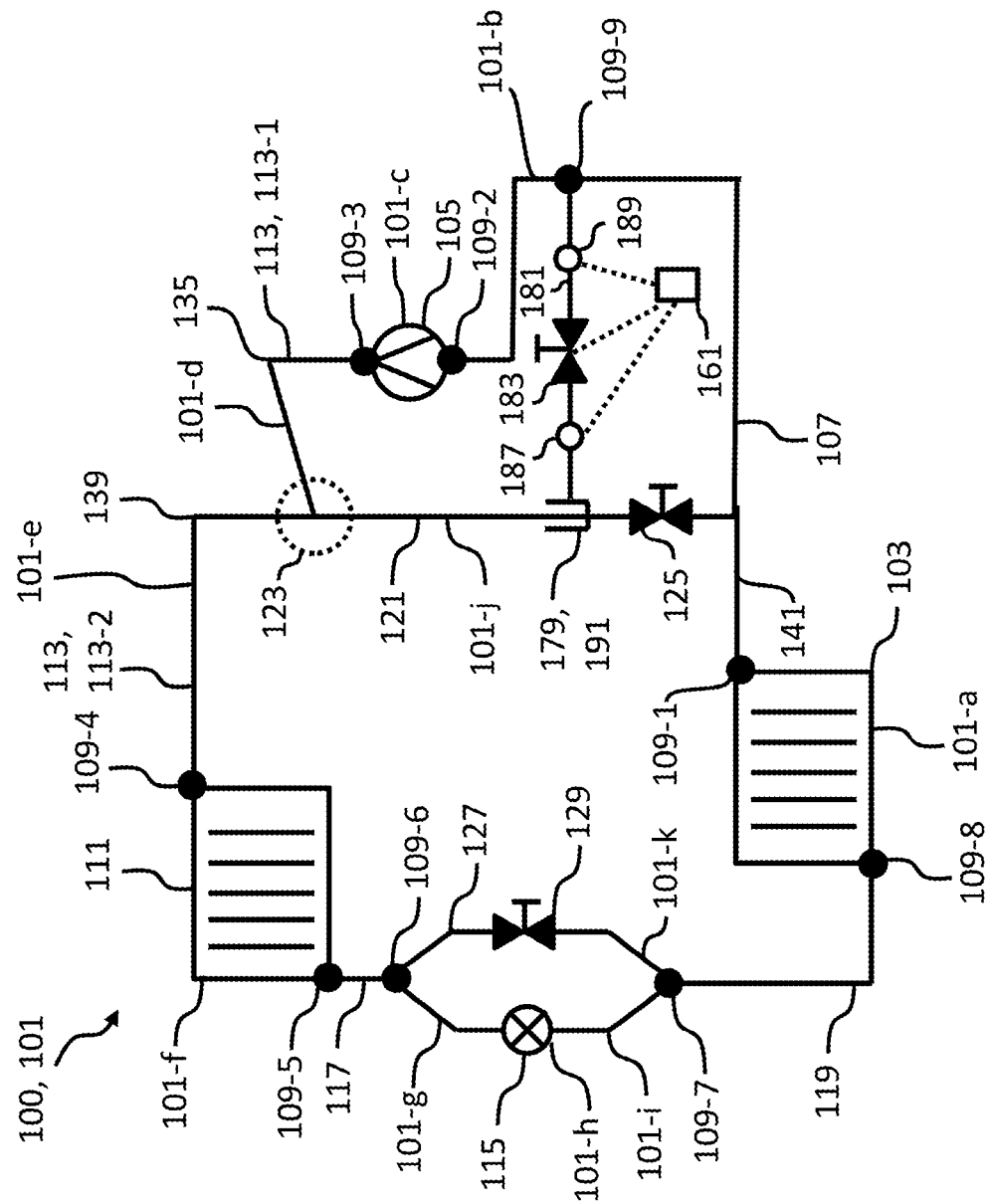
FIG. 22 is a schematic diagram of a cooling circuit according to an embodiment of the present disclosure.

For more details in respect to the function of the oil release valve 183 reference to the following FIGS. 20, 21 and 22 is provided.

FIG. 20 is a schematic diagram of a cooling circuit 101 according to an example.

The cooling circuit 101 shown in FIG. 20 essentially corresponds to the cooling circuit 101 shown in FIG. 1 except for the following differences.

The fluid by-pass line 121 of the cooling circuit 101 comprises a cooling agent insertion portion 185, which is connected to the first fluid line 107 to allow for inserting the cooling agent into the fluid by-pass line 121 during the passive cooling mode.

Moreover, the fluid by-pass line 121 comprises an oil collection portion 179, which is connected to the first fluid line 107 by an oil release line 181, which comprises an oil release valve 183, which is operated by a control 161 of the cooling device 100.

The oil release line 181 and/or oil release valve 183 comprises a further oil level sensor 187, which is adapted to detect a level of lubricant oil collected in the oil release line 181.

The oil release line 181 and/or oil release valve 183 comprises a further flow rate sensor 189, which is adapted to detect a flow rate of lubricant oil flowing from the oil collecting portion 179, 192 through the oil release line 181.

The control 161 is adapted to operate the oil release valve 183 in dependence of the detected level of lubricant oil and/or in dependence of the detected flow rate of lubricant oil.

In particular the control 161 is adapted to switch the oil release valve 183 between a first valve position for completely closing the oil release line 181 to a second valve position for completely opening the oil release line 181, if the detected level of lubricant oil increases above a level threshold. By selecting the level threshold a starting point for the release of the lubricant oil from the oil release line 181 can be set.

In particular the control 161 is adapted to switch the oil release valve 183 between the second valve position for completely opening the oil release line 181 to a first valve position for completely closing the oil release line 181, if the detected flow of lubricant oil increases above a further flow rate threshold. By selecting the further level threshold an end point for the release of the lubricant oil from the oil release line 181 can be set.

FIG. 21 is a schematic diagram of a fluid by-pass line 121 according to an example.

In FIG. 21 a cross section of the fluid by-pass line 121 is shown, wherein the fluid by-pass line 121 comprises an oil collecting portion 179, which in turn comprises a recess 191, wherein the recess 191 is formed in the wall 122 of the fluid by-pass line 121.

The recess 191 is adapted to collect lubricant oil, which flows down the wall 122 of the fluid by-pass line. The recess 191 is connected to an oil release line 181, wherein the oil release line 181 is connected to the first fluid line 107, which is not shown in FIG. 21. For further details in respect to the oil release line 181 reference to the description of FIGS. 19, 20 and 22 is provided.

FIG. 22 is a schematic diagram of a cooling circuit 101 according to an example.

The cooling circuit 101 shown in FIG. 22 essentially corresponds to the cooling circuit 101 shown in FIG. 20 except for the following differences.

Instead of a tapering section 192, the oil collecting portion 179 is formed as a recess 191, which is shown in detail in FIG. 21. The recess 191 is formed in the wall 122 of the fluid by-pass line 121 and is adapted to collect lubricant oil flowing down the wall 122 of the fluid by-pass line 121. The recess 191 is connected to the first fluid line 107 by an oil release line 181. For further details in respect to the oil release line 181 reference to the description of FIGS. 19 and 20 is provided.

FIG. 23 is a flow diagram illustrating a method 200 for cooling according to an example.

The method 200 comprises the steps of:

At least partially closing 201 of the fluid by-pass line 121 in an active cooling mode by the by-pass valve 125.

Compressing 203 cooling agent present in the cooling circuit 101 during the active cooling mode by the compressor 105, wherein the compressed cooling agent contains lubricant oil from the compressor 105.

Physically separating 205 the lubricant oil from the compressed cooling agent by the separating portion 123, so that the lubricant oil is collected in the fluid by-pass line 121.

In particular, the method 200 comprising the following optional method step of opening 207 of the fluid by-pass line 121 in a passive cooling mode by the by-pass valve 125, so that the cooling agent directly flows from the evaporator 103 through the fluid by-pass line 121 to the condenser 111, and so that the collected lubricant oil flows from the fluid by-pass line 121 to the first fluid line 107.

Further features of the method 200 result directly from the structure and/or functionality of the cooling device 100, respectively cooling circuit 101 as well as its different examples described above.

The person skilled in the art will understand that the "blocks" ("units") of the various figures (method and apparatus) represent or describe functionalities of examples of the present disclosure (rather than necessarily individual "units" in hardware or software) and thus describe equally functions or features of apparatus examples as well as method examples (unit=step).

In the several examples provided in the present disclosure, it should be understood that the disclosed apparatus, and method may be implemented in other manners. For example, the described example of an apparatus is merely exemplary.

What is claimed is:

1. A cooling device, comprising:
a cooling circuit, the cooling circuit comprising:
an evaporator;
a compressor, which is connected to the evaporator by a first fluid line of the cooling circuit, wherein the compressor is adapted to compress a cooling agent present in the cooling circuit during an active cooling mode, wherein the compressed cooling agent contains lubricant oil from the compressor;
a condenser, which is connected to the compressor by a second fluid line of the cooling circuit; and
a fluid by-pass line, which connects the first fluid line with the second fluid line,
wherein the fluid by-pass line comprises a by-pass valve, which is configured to at least partially close the fluid by-pass line in the active cooling mode,
wherein the second fluid line is connected to the fluid by-pass line by a separator, and wherein the separator is configured to physically separate lubricant oil from the compressed cooling agent, so that the lubricant oil is collected in the fluid by-pass line,
wherein at the separator, an end portion of the second fluid line is inserted into the interior of the fluid by-pass line,
wherein the fluid by-pass line is oriented vertically in the cooling device,
wherein compressed gaseous cooling agent containing lubricant oil is configured to enter the interior of the fluid by-pass line through the end portion of the second fluid line,
wherein the lubricant oil is separated from the compressed gaseous cooling agent by the effect of gravity,
wherein the lubricant oil drops down in the vertically oriented fluid by-pass line, and the compressed gaseous cooling agent is configured to rise up in the vertically oriented fluid by-pass line by the pressure applied to the cooling agent from the compressor,
wherein a first axis corresponding to the direction of extension of the fluid by-pass line and a second axis corresponding to the direction of extension of the end portion of the second fluid line are arranged with an angle in respect to each other, and
wherein the angle is in a range of 15° to 90°.

2. The cooling device according to claim 1, wherein the by-pass valve is configured to at least partially close the fluid by-pass line in the active cooling mode, and
wherein during the active cooling mode, the cooling agent is configured to be pumped by the compressor from the evaporator through the first fluid line, through the compressor, and through the second fluid line to the condenser.

3. The cooling device according to claim 1, wherein the by-pass valve is configured to open the fluid by-pass line in a passive cooling mode,
wherein during the passive cooling mode, the cooling agent is configured to flow from the evaporator through the first fluid line, through the fluid by-pass line and through the second fluid line to the condenser, and
wherein in the passive cooling mode, the collected lubricant oil is configured to flow from the fluid by-pass line through the first fluid line to the compressor.

4. The cooling device according to claim 1, wherein in the active cooling mode, the by-pass valve is adapted to completely close the fluid by-pass line, or
wherein in the active cooling mode, the by-pass valve is adapted to partially close the fluid by-pass line by decreasing the cross-section of the fluid by-pass line between 1% and 99%.

5. The cooling device according to claim 1, wherein the separator is formed as a three-way junction comprising a first fluid connection to the compressor, a second fluid connection to the condenser, and a third fluid connection to the evaporator.

6. The cooling device according to claim 1, wherein the end portion of the second fluid line is inserted into the interior of the fluid by-pass line tangentially in respect to the circumference of the fluid by-pass line.

7. The cooling device according to claim 1, wherein a second axis corresponding to the direction of extension of the end portion of the second fluid line intersects a first axis corresponding to the direction of extension of the fluid by-pass line, or
wherein a second axis corresponding to the direction of extension of the end portion of the second fluid line is arranged at an offset with respect to a first axis corresponding to the direction of extension of the fluid by-pass line.

8. The cooling device according to claim 1, wherein the diameter of at least a part of the second fluid line is smaller than the diameter of at least a part of the fluid by-pass line.

9. The cooling device according to claim 1, wherein the fluid by-pass line comprises an oil conveyor, which is configured to convey the collected lubricant oil through the fluid by-pass line.

10. A cooling device, comprising:
a cooling circuit, the cooling circuit comprising:
an evaporator;
a compressor connected to the evaporator by a first fluid line of the cooling circuit, the compressor being adapted to compress a cooling agent present in the cooling circuit during an active cooling mode, wherein the compressed cooling agent contains lubricant oil from the compressor;
a condenser connected to the compressor by a second fluid line of the cooling circuit; and
a fluid by-pass line that connects the first fluid line with the second fluid line,
wherein the fluid by-pass line comprises a by-pass valve configured to at least partially close the fluid by-pass line in the active cooling mode,
wherein the second fluid line is connected to the fluid by-pass line by a separator,
wherein the separator is configured to physically separate lubricant oil from the compressed cooling agent, so that the lubricant oil is collected in the fluid by-pass line,
wherein the cooling device comprises a control,
wherein the fluid by-pass line and/or the by-pass valve comprises an oil level sensor, which is configured to detect a level of lubricant oil collected in the fluid by-pass line, and/or a flow rate sensor, which is configured to detect a flow rate of lubricant oil flowing in the fluid by-pass line, and
wherein the control is configured to operate the by-pass valve in dependence of the detected level of lubricant oil and/or in dependence of the detected flow rate of lubricant oil.

11. The cooling device according to claim 1, wherein the cooling circuit further comprises:
- an expansion device, which is connected to the condenser by a third fluid line of the cooling circuit, and which is connected to the evaporator by a fourth fluid line of the cooling circuit; and
- a further fluid by-pass line, which connects the third fluid line with the fourth fluid line,
- wherein the further fluid by-pass line comprises a further by-pass valve, which is configured to close the further fluid by-pass line in the active cooling mode and to open the further fluid by-pass line in a passive cooling mode, wherein in the passive cooling mode, the cooling agent is configured to directly flow from the condenser through the further fluid by-pass line to the evaporator.

12. The cooling device according to claim 11, wherein the further by-pass valve is configured to close the further fluid by-pass line in a first valve position, and wherein during the active cooling mode, the cooling agent is configured to be pumped by the compressor from the condenser through the third fluid line, through the expansion device, and through the fourth fluid line to the evaporator, and
- wherein the further by-pass valve is configured to open the further fluid by-pass line in a second valve position, and wherein during the passive cooling mode, the cooling agent is configured to flow from the condenser through the third fluid line, through the further fluid by-pass line, and through the fourth fluid line to the evaporator.

13. The cooling device according to claim 11, wherein in the active cooling mode, the by-pass valve is configured to at least partially close the fluid by-pass line and the further by-pass valve is in the first valve position to close the further fluid by-pass line,
- wherein in the active cooling mode, the compressor is configured to compress gaseous cooling agent, wherein the compressed gaseous cooling agent is configured to be conducted through the second fluid line to the condenser, wherein the condenser is configured to condensate the compressed gaseous cooling agent, in order to obtain liquid cooling agent, wherein the liquid cooling agent is configured to be conducted through the third fluid line to the expansion device, wherein the expansion device is configured to expand the liquid cooling agent, in order to obtain expanded liquid cooling agent, wherein the expanded liquid cooling agent is configured to be conducted through the fourth fluid line to the evaporator, wherein the evaporator is configured to evaporate the expanded liquid cooling agent, in order to obtain the gaseous cooling agent, wherein the gaseous cooling agent is configured to be conducted through the first fluid line to the compressor, and
- wherein in the active cooling mode, the separator is configured to physically separate lubricant oil from the compressed gaseous cooling agent, so that the lubricant oil is collected in the fluid by-pass line.

14. The cooling device according to claim 11, wherein in the passive cooling mode, the by-pass valve is configured to open the fluid by-pass line, and the further by-pass valve is in the second valve position to open the further fluid by-pass line,
- wherein in the passive cooling mode, the compressor is deactivated, wherein in the passive cooling mode, gaseous cooling agent is configured to be conducted from the evaporator through the first fluid line, through the fluid by-pass line and through the second fluid line to the condenser, wherein the condenser is configured to condensate the gaseous cooling agent, in order to obtain liquid cooling agent, wherein the liquid cooling agent is configured to be conducted through the third fluid line, through the further fluid by-pass line and through the fourth fluid line to the evaporator, wherein the evaporator is configured to evaporate the liquid cooling agent, in order to obtain the gaseous cooling agent, and
- wherein in the passive cooling mode, the lubricant oil, which is collected in the fluid by-pass line, is configured to flow from the fluid by-pass line through the first fluid line to the compressor.

15. The cooling device according to claim 1, wherein the by-pass valve is formed as a ball valve comprising a ball element, which is received in a ball housing,
- wherein the ball element is rotatable between a first rotation position and a second rotation position, wherein the ball element comprises at least one channel for conducting cooling agent through the ball element in the first rotation position of the ball element, and
- wherein the at least one channel for conducting cooling agent is sealed off by the ball housing in the second rotation position of the ball element.

16. The cooling device according to claim 15, wherein at least a part of the ball element and/or at least a part of the ball housing is formed from a porous material, which is configured to conduct lubricant oil through the ball element and/or through the ball housing.

17. The cooling device according to claim 15, wherein the ball element comprises a first channel for conducting cooling agent through the ball element in the first rotation position of the ball element, and wherein the ball element comprises a second channel or second groove for conducting lubricant oil through the ball element in the second rotation position of the ball element.

18. The cooling device according to claim 17, wherein the second channel or second groove of the ball element is sealed off by the ball housing in the first rotation position of the ball element, and wherein the first channel of the ball element is sealed off by the ball housing in the second rotation position of the ball element.

19. The cooling device according to claim 15, wherein the ball housing comprises a third channel or a third groove for conducting lubricant oil through the ball housing.

20. A cooling device, comprising:
- a cooling circuit, the cooling circuit comprising:
- an evaporator;
- a compressor connected to the evaporator by a first fluid line of the cooling circuit, the compressor being adapted to compress a cooling agent present in the cooling circuit during an active cooling mode, wherein the compressed cooling agent contains lubricant oil from the compressor;
- a condenser connected to the compressor by a second fluid line of the cooling circuit; and
- a fluid by-pass line that connects the first fluid line with the second fluid line,
- wherein the fluid by-pass line comprises a by-pass valve configured to at least partially close the fluid by-pass line in the active cooling mode,
- wherein the second fluid line is connected to the fluid by-pass line by a separator,
- wherein the separator is configured to physically separate lubricant oil from the compressed cooling agent, so that the lubricant oil is collected in the fluid by-pass line, wherein the fluid by-pass line comprises an oil collecting portion for collecting lubricant oil in the fluid by-pass line, wherein the oil collecting portion is connected to an oil release line, and wherein the oil release line is connected to the first fluid line, in order to conduct lubricant oil from the oil collecting portion through the oil release line to the first fluid line.

21. The cooling device according to claim 20, wherein the oil collecting portion comprises a recess, which is formed in the wall of the fluid by-pass line or wherein the oil collecting portion comprises a tapering section of the fluid by-pass line.

22. The cooling device according to claim 20, wherein the oil release line comprises an oil release valve, which is configured to close the oil release line in order to retain the lubricant oil in the oil collecting portion or to open the oil release line in order to transfer the lubricant oil from the oil collecting portion through the oil release line to the first fluid line.

23. The cooling device according to claim 22, wherein the cooling device comprises a control, wherein the oil release line and/or oil release valve comprises a further oil level sensor, which is configured to detect a level of lubricant oil collected in the oil release line and/or a further flow rate sensor, which is configured to detect a flow rate of lubricant oil flowing from the oil collecting portion to the oil release valve, and wherein the control is configured to operate the oil release valve in dependence of the detected level of lubricant oil and/or in dependence of the detected flow rate of lubricant oil.

24. A method for cooling by using a cooling circuit of a cooling device, wherein the cooling circuit comprises an evaporator, a compressor, which is connected to the evaporator by a first fluid line of the cooling circuit, a condenser, which is connected to the compressor by a second fluid line of the cooling circuit, and a fluid by-pass line of the cooling circuit, which connects the first fluid line with the second fluid line, wherein the second fluid line is connected to the fluid by-pass line by a separator, and wherein the fluid by-pass line comprises a by-pass valve, the method comprising:

at least partially closing of the fluid by-pass line in an active cooling mode by the by-pass valve, compressing cooling agent present in the cooling circuit during the active cooling mode by the compressor, wherein the compressed cooling agent contains lubricant oil from the compressor, and physically separating the lubricant oil from the compressed cooling agent by the separator, so that the lubricant oil is collected in the fluid by-pass line, wherein the by-pass valve is configured to at least partially close the fluid by-pass line in the active cooling mode, wherein the second fluid line is connected to the fluid by-pass line by a separator, wherein the separator is configured to physically separate lubricant oil from the compressed cooling agent, so that the lubricant oil is collected in the fluid by-pass line, wherein at the separator, an end portion of the second fluid line is inserted into the interior of the fluid by-pass line, wherein the fluid by-pass line is oriented vertically in the cooling device, wherein compressed gaseous cooling agent containing lubricant oil is configured to enter the interior of the fluid by-pass line through the end portion of the second fluid line, wherein the lubricant oil is separated from the compressed gaseous cooling agent by the effect of gravity, wherein the lubricant oil drops down in the vertically oriented fluid by-pass line, and the compressed gaseous cooling agent is configured to rise up in the vertically oriented fluid by-pass line by the pressure applied to the cooling agent from the compressor, wherein a first axis corresponding to the direction of extension of the fluid by-pass line and a second axis corresponding to the direction of extension of the end portion of the second fluid line are arranged with an angle in respect to each other, and wherein the angle is in a range of 15° to 90°.

25. The method of claim 24, further comprising:

opening the fluid by-pass line in a passive cooling mode by the by-pass valve, so that the cooling agent directly flows from the evaporator through the fluid by-pass line to the condenser, and the collected lubricant oil flows from the fluid by-pass line to the first fluid line.

* * * * *